United States Patent [19]
Ito et al.

[11] Patent Number: 5,632,939
[45] Date of Patent: May 27, 1997

[54] METHOD OF FORMING MOLDING ON PLATELIKE ARTICLE USING EXTRUSION DIE

[75] Inventors: Tosikazu Ito, Obu; Yutaka Yamauchi, Matsusaka; Takashi Araki, Obu, all of Japan

[73] Assignees: Central Glass Company, Ltd., Ube; Tokai Kogyo Kabushiki Kaisha, Obu, both of Japan

[21] Appl. No.: 395,347

[22] Filed: Feb. 28, 1995

[30] Foreign Application Priority Data

Feb. 28, 1994 [JP] Japan ..................... 6-030474

[51] Int. Cl.$^6$ .................. B29C 47/02; B29C 47/92
[52] U.S. Cl. ............. 264/40.5; 156/106; 156/244.12; 264/173.17; 264/177.1; 264/177.16; 264/252; 425/113; 425/131.1; 425/375
[58] Field of Search .................. 156/108, 109, 156/244.11, 106, 244.12; 264/40.5, 40.7, 177.1, 177.16, 252, 173.17; 425/375, 464, 465, 466, 113, 131.1

[56] References Cited

U.S. PATENT DOCUMENTS

| | | | |
|---|---|---|---|
| 5,057,265 | 10/1991 | Kunert et al. | 264/511 |
| 5,108,526 | 4/1992 | Cornils et al. | 156/108 |
| 5,273,704 | 12/1993 | Scholl et al. | 264/177.1 |
| 5,435,961 | 7/1995 | Micciche | 425/375 |
| 5,456,874 | 10/1995 | Cordes et al. | 156/108 |

FOREIGN PATENT DOCUMENTS

| | | |
|---|---|---|
| 0345134A2 | 12/1989 | European Pat. Off. . |
| 0444998A1 | 9/1991 | European Pat. Off. . |
| 0638408A1 | 2/1992 | European Pat. Off. . |
| 0493068A1 | 7/1992 | European Pat. Off. . |
| 0568014A1 | 11/1993 | European Pat. Off. . |
| 0634263A1 | 1/1995 | European Pat. Off. . |
| 57-158479 | 9/1982 | Japan . |
| 2-106427 | 4/1990 | Japan . |
| 4-151225 | 5/1992 | Japan . |
| 4-261822 | 9/1992 | Japan . |
| 5-330334 | 12/1993 | Japan . |
| 6-8728 | 1/1994 | Japan . |
| 6-87146 | 3/1994 | Japan . |

*Primary Examiner*—Mathieu D. Vargot
*Attorney, Agent, or Firm*—Keck, Mahin & Cate

[57] ABSTRACT

The invention provides a method of producing a platelike article having a molding formed on a peripheral edge thereof, using an extrusion die having a cavity for supplying a molding material to the peripheral edge. The peripheral edge has a straight portion and a curved corner portion. The cavity has first and second cavity portions. The method includes the steps of: (a) inserting the peripheral edge of the platelike article into the cavity of the extrusion die; (b) supplying the molding material to the cavity; (c) moving the platelike article relative to the extrusion die, with a moving speed of "Vs" at the straight portion and with a moving speed of "Vc" at the curved corner portion, while the peripheral edge is kept inserted in the cavity; and (d) extruding the molding material from the cavity onto the peripheral edge so as to form the molding on the peripheral edge, with an extrusion rate of "Ms" at the straight portion and with an extrusion rate of "Mc" at the curved corner portion, while the steps (b) and (c) are conducted, wherein the steps of (b), (c) and (d) are respectively controlled in accordance with a radius of curvature of the curved corner portion and/or with a sectional shape of the molding such that Mc/Vc becomes different from Ms/Vs. According to the method, the molding has a substantially constant sectional shape as desired even at a curved corner portion of the platelike article.

26 Claims, 20 Drawing Sheets

5,632,939

METHOD OF FORMING MOLDING ON PLATELIKE ARTICLE USING EXTRUSION DIE

BACKGROUND OF THE INVENTION

The present invention relates to a method of forming a frame-like molding on a peripheral edge portion of a plate-like article such as a window glass, using an extrusion die. In this method, a molding extruded from the extrusion die is continuously formed on the peripheral edge portion, simultaneously with the extrusion of the molding. As is known, the molding formed thereon has various functions such as protective, sealing and decorative functions.

There are various proposals for providing an automotive or architectural window glass with a frame-like molding, as follows.

JP-A-57-158479 discloses a method of fixing a molding, gasket or the like to a glass plate. In this method, a molding or gasket 3 is fixed to a glass plate 4 by a pressing roller 5 immediately after a material for the molding or gasket 3 is extruded from a die 2 of an extruder 1 (see FIG. 1 of this publication). The pressing roller 5 and the extruder 1 are moved along a peripheral edge of the glass plate 4 for fixing the molding or gasket 3 on the peripheral edge thereof.

JP-A-2-106427 discloses a method of simultaneously forming first and second ribbons on an automotive window glass (see FIG. 9 of this publication). The second ribbon 15 is formed on the first ribbon 12 and is to be adhered to the automotive body (for example, see FIG. 1 of this publication). The first ribbon 12 is designed to cure within a very short time. In contrast, the second ribbon 15 is designed not to cure until the window glass is fixed to an automotive body. That is, the second ribbon 15 is maintained to have plasticity and adhesion until the window glass is fixed to an automotive body.

U.S. Pat. No. 5,108,526 discloses an apparatus for extruding a polymer profile directly on a peripheral edge portion of one major surface of a glass plate. This apparatus has a means for modifying a polymer flow through one of polymer supply channels. The modification takes place as a function of the radius of curvature (R) of the path covered by an extrusion die of the apparatus.

JP-A-4-151225 discloses a method of fixing a molding to a peripheral edge portion of a window glass by rotating the window glass relative to an extruder's die fixed at one position.

JP-A-6-8728 discloses a method of producing a window glass having a molding. In this method, while a synthetic resin material is extruded from a die onto a peripheral edge portion of one surface of the window glass, a die is moved along a peripheral edge portion of the window glass and the locus and angle of the die 3 are corrected.

JP-A-5-330334 discloses another method of producing a window glass having a molding. In this method, a molding and a dam are formed at the same time on a peripheral edge of a window glass by extruding a synthetic resin material(s) from a die(s).

JP-A-4-261822 discloses a window glass with a molding, a method of producing this window glass, and an apparatus for producing this window glass. In this method, at first, a resin adhesive 4 is applied to a peripheral edge of a window glass 3. Then, a portion of the peripheral edge of the window glass 3 is inserted into a cavity 17 of a die 13. Then, an extruded molding 5 is continuously applied to the peripheral edge of the window glass 3, simultaneously with the extrusion of the molding 5, while the window glass 3 is suitably rotated relative to an extruder.

There is an increasing demand to provide a window glass with a molding, which molding has a substantially constant sectional shape as desired even at a curved corner portion of the window glass, particularly in case that the molding has a lip portion extending outward from a major portion of the molding.

SUMMARY OF THE INVENTION

It is therefore an object of the present invention to provide an improved method of forming a frame-like molding on a peripheral edge portion of a platelike article using an extrusion die, which molding has a substantially constant sectional shape as desired even at a curved corner portion of the platelike article.

According to the present invention, there is provided a method of producing a platelike article having a molding formed on a peripheral edge of the platelike article, using an extrusion die having a cavity for supplying a molding material to the peripheral edge, the peripheral edge having a straight portion and a curved corner portion, the cavity having an orifice of a certain shape for imparting the certain shape to the molding material, the cavity having first and second cavity portions, the method comprising the steps of:

(a) inserting the peripheral edge of the platelike article into the cavity of the extrusion die such that the first cavity portion is occupied by the peripheral edge;

(b) supplying the molding material to the second cavity portion;

(c) moving the extrusion die relative to the platelike article, with a moving speed of "Vs" at the straight portion and with a moving speed of "Vc" at the curved corner portion, while the peripheral edge is kept inserted in the cavity; and (d) extruding the molding material from the second cavity portion through the orifice onto the peripheral edge so as to form the molding on the peripheral edge, with an extrusion rate of "Ms" at the straight portion and with an extrusion rate of "Mc" at the curved corner portion, while the steps (b) and (c) are conducted, wherein the steps of (b), (c) and (d) are respectively controlled in accordance with a radius of curvature of the curved corner portion and/or with a sectional shape of the molding such that Mc/Vc becomes different from Ms/Vs.

By virtue of an improved method of the present invention, even in case that the molding has a lip portion, deformation of the lip portion at a curved corner portion of the platelike article is substantially suppressed. In other words, the molding even having a lip portion becomes substantially constant as desired in sectional shape even at the curved corner portion as well as a straight peripheral portion of the platelike article.

DESCRIPTION OF THE PREFERRED EMBODIMENTS

With reference to FIGS. 1–43, an improved method of forming a frame-like molding on a peripheral edge portion of a platelike article such as a window glass, using an extrusion die, for the purpose of obtaining a substantially constant sectional shape of the molding as desired, even at a curved corner portion of the platelike article, will be described in the following in accordance with the present invention.

Figure 1:
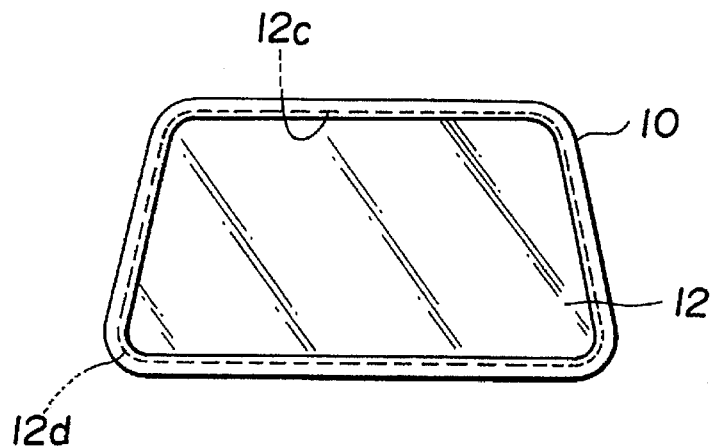
FIG. 1 is a plan view showing a window glass having a molding formed on an entire peripheral edge portion thereof.
Figure 2:
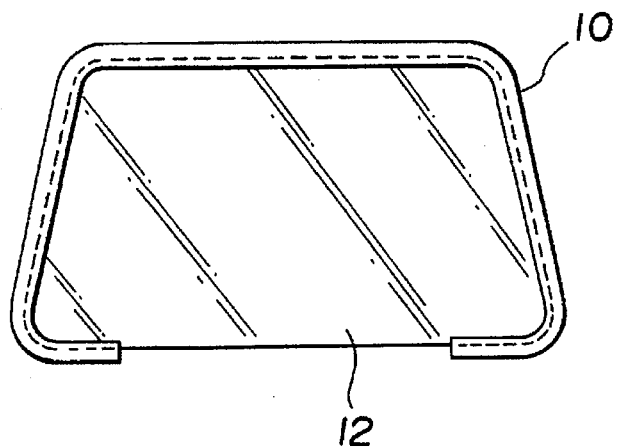
FIG. 2 is a view similar to FIG. 1, but showing another molding formed on only a major part of the peripheral edge portion thereof.

In the invention, as is shown in FIG. 1, a molding 10 may cover the entire peripheral edge portion of a window glass 12 or, as is shown in FIG. 2, a molding 10 may cover only a major part of the peripheral edge portion.

In the invention, an extruded molding is continuously formed on a peripheral edge portion of a window glass, simultaneously with the extrusion of a material for the molding, while the window glass is suitably rotated relative to an extrusion die. It is optional in the invention that a primer (an adhesive) for enhancing adhesion strength of the molding to a window glass is applied to the peripheral edge portion thereof, simultaneously with the extrusion of the molding or that the primer is applied to the peripheral edge portion prior to the extrusion of the molding.

Figure 3:
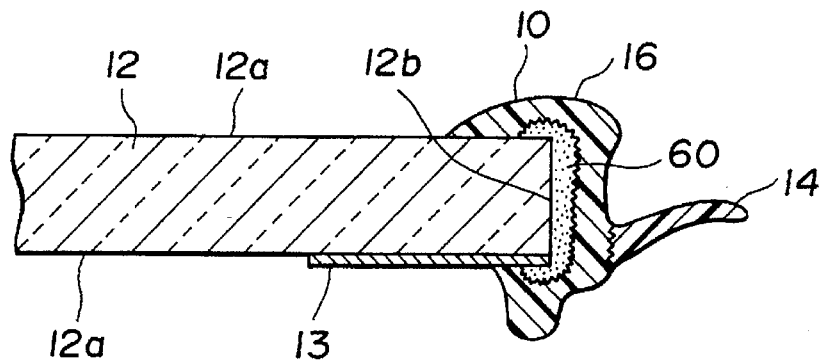
FIG. 3 is a sectional view showing an example of the molding formed on a peripheral edge portion of a window glass.
Figure 4:
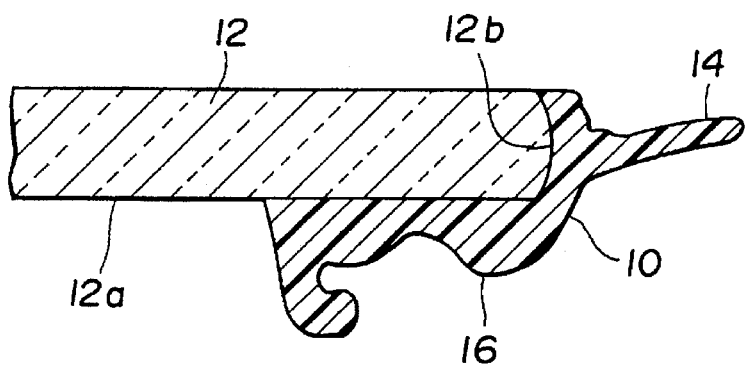
FIGS. 4–6 are views similar to FIG. 3, but showing other examples of the molding.
Figure 5:
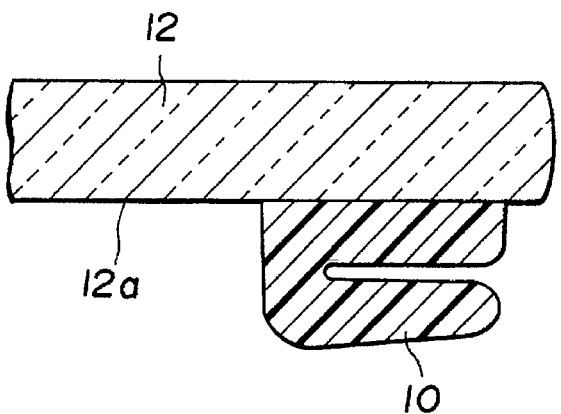
Figure 6:
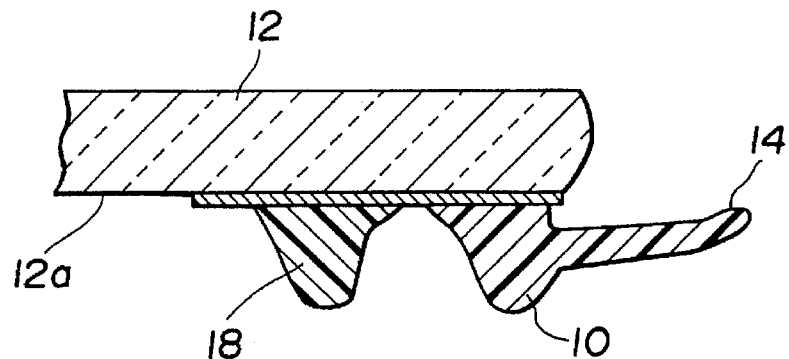

In general, a window glass has first and second major surfaces which are opposed to each other and an edge surface connecting these major surfaces with each other. In the invention, as is shown in FIG. 3, it is optional that the molding 10 covers all of peripheral portions of these major surfaces 12a, 12a and the edge surface 12b. In FIG. 3, designated by numeral 13 is a color coating film formed on a peripheral edge portion of the first or second major surface 12a. Furthermore, as is shown in FIG. 4, it is optional that the molding 10 covers only a peripheral portion of the first or second major surface 12a and the edge surface 12b. Still furthermore, as is shown in FIGS. 5–6, it is optional that the molding 10 covers only a peripheral portion of the first or second major surface 12a.

As is shown in FIG. 3, in case that the window glass is an automotive window glass, the molding 10 may have an optional lip portion 14 which extends outward from a major portion 16 of the molding 10. The lip portion 14 is brought into abutment with an automotive body when the window glass is attached to the automotive body. Furthermore, as is shown in FIG. 6, in case that the window glass is an automotive window glass, the molding 10 may have an optional dam portion 18 which serves to suppress over flow of a urethane sealer for attaching the window glass 12 to an automotive body.

As is shown in FIG. 1, it is general that an automotive window glass has straight peripheral edge portions 12c and curved corner portions 12d.

In the invention, the moving speed of an extrusion die of the present invention relative to the window glass and the extrusion rate (i.e. extrusion length per unit time or extrusion amount per unit time) of the extruder are respectively suitably controlled under different circumstances. In fact, as will be clarified hereinafter, it is an important feature of the present invention that the extrusions at a straight peripheral edge portion 12c and at a curved corner portion 12d of the window glass are respectively specifically controlled in accordance with the radius of curvature of the curved corner portion and/or with the sectional shape of the molding such that Mc/Vc becomes different from Ms/Vs, wherein Mc and Ms represent the extrusion rates of the molding material from the extrusion die at the curved corner portion and at the straight peripheral edge portion respectively, and Vc and Vs represent the moving speeds of the extrusion die relative to the window glass at the curved corner portion and at the straight peripheral edge portion respectively.

As is mentioned hereinabove, in the invention, the radius of curvature of a curved corner portion of the window glass and the sectional shape of the molding are factors for determining the value of Mc/Vc relative to the value of Ms/Vs. In the invention, in accordance with at least one of these factors, extrusions at the straight peripheral edge portion and at the curved corner portion are respectively specifically controlled such that Mc/Vc is different from Ms/Vs.

Figure 37:
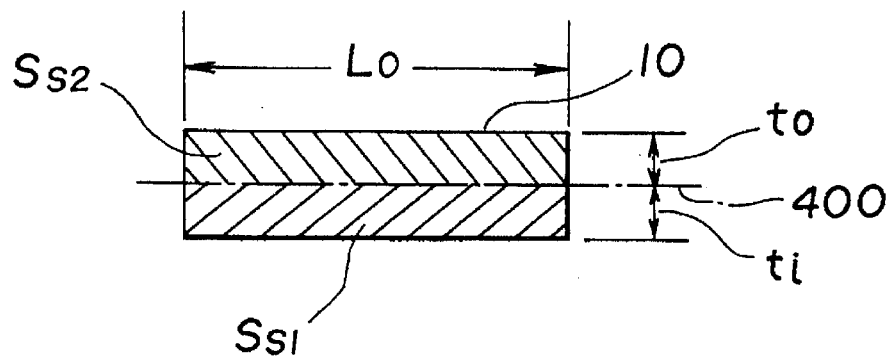
FIG. 37 is a partial plan view showing a portion of a molding at a straight peripheral edge portion of a window glass.

In the following, with reference to FIGS. 37–41, the control of the extrusion in accordance with the sectional shape of the molding, which is one factor determining the value of Mc/Vc relative to the value of Ms/Vs will be described. FIG. 37 is a partial plan view showing a portion of the molding 10 at a straight peripheral edge portion of the window glass. Designated by symbol Lo is a length of this portion of the molding 10. Designated by numeral 400 is an imaginary surface which is on the plane of the edge surface of the window glass (see FIG. 39). In the invention, the movement of the extrusion die relative to the window glass is controlled such that the extrusion die moves along the imaginary surface 400. In FIG. 37, the window glass itself is omitted and thus not shown. As is shown in FIG. 37, the molding 10 can be divided by the imaginary surface 400 into inner and outer portions. Designated by symbols Ss1 and Ss2 are the areas of the inner and outer portions, respectively. Designated by symbols "ti" and "to" are the widths of the inner and outer portions, respectively.

Figure 38:
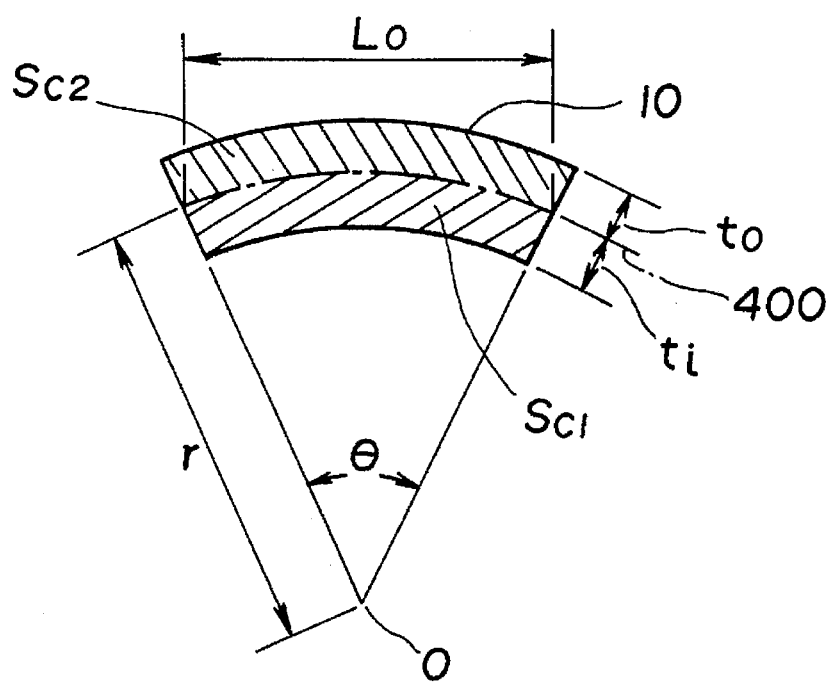
FIG. 38 is a view similar to FIG. 37, but showing a portion of a molding at a curved corner portion thereof.
Figure 39:
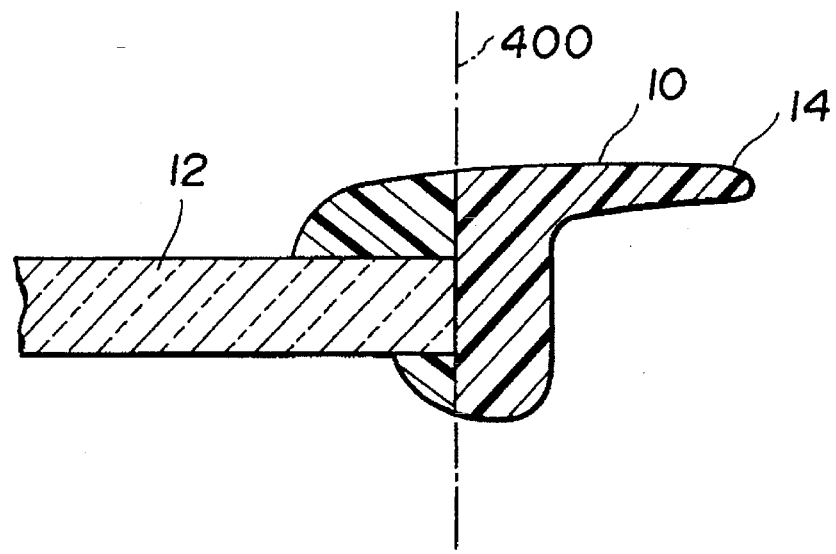
FIG. 39 is a view similar to FIG. 3, but showing a molding divided into outer and inner portions by a imaginary surface on the plane of the edge surface of the molding.

FIG. 38 is a partial plan view showing a portion of the molding 10 at a curved corner portion of the window glass. Designated by symbol Lo is a length of this portion of the molding 10. Designated by numeral 400 is an edge surface of the window glass. In this figure, the window glass itself is omitted and thus not shown. As is shown in FIG. 38, the molding 10 can be divided by the imaginary surface 400 into inner and outer portions. Designated by symbols Sc1 and Sc2 are the areas of the inner and outer portions, respectively. Designated by symbols "ti" and "to" are the widths of the inner and outer portions, respectively. Designated by symbols r, O and θ are the radius of curvature, center of curvature and the center angle, respectively. The area Sc2 will be compared with the area Ss2 in the following.

$Sc2=(\theta/360)\pi\{(r+to)^2-r^2\}=(\theta/360)\pi(2r+to)to$ $Lo=(\theta/360)2\pi r$ Therefore, Ss2 will be expressed as follows.

$Ss2=to\ Lo=(\theta/360)2\pi rto$

Therefore, the difference between Sc2 and Ss2 will be expressed as follows.

$Sc2-Ss2=(\theta/360)\pi to(2r+to-2r)=(\theta/360)\pi to^2$

Therefore, Sc2 which is the area of the outer portion at the curved corner portion is larger than Ss2 which is the area of the outer portion at the straight peripheral portion by $(\theta/360)\pi to^2$. In other words, if the extrusion rate at the curved corner portion is maintained as is the same as that at the straight peripheral portion, the amount of the molding material for the outer portion Sc2 becomes insufficient at the curved corner portion by the amount of $(\theta/360)\pi to^2$ multiplied by the thickness of the outer portion.

The area Sc1 will be compared with the area Ss1 in the following.

$Sc1=(\theta/360)\pi\{r^2-(r-ti)^2\}=(\theta/360)\pi(2r-ti)ti$ $Lo=(\theta/360)2\pi r$ Therefore, Ss1 will be expressed as follows.

$Ss1=ti\ Lo=(\theta/360)2\pi rti$

Therefore, the difference between Sc1 and Ss1 will be expressed as follows.

$Sc1-Ss1=(\theta/360)\pi ti(2r-ti-2r)=-(\theta/360)\pi ti^2$

Therefore, Sc1 which is the area of the inner portion at the curved corner portion is smaller than Ss1 which is the area of the inner portion at the straight peripheral portion by $(\theta/360)\pi ti^2$. In other words, if the extrusion rate at the curved corner portion is maintained as is the same as that at the straight peripheral portion, the amount of the molding material for the inner portion Sc1 becomes excessive at the curved corner portion by the amount of $(\theta/360)\pi ti^2$ multiplied by the thickness of the inner portion.

In case that "to" equals to "ti", the excessive amount of the outer portion at the corner curved portion, $(\theta/360)\pi to^2$, becomes the same as the insufficient amount of the inner portion at the corner curved portion, $(\theta/360)\pi ti^2$. In other words, the amount of molding material at the curved corner portion does not become excessive nor insufficient as compared with that at the straight peripheral portion. In this case, it is not necessary to consider the factor of the sectional shape of the molding with respect to the imaginary surface 400 in the determination of the value of Mc/Vc relative to the value of Ms/Vs. This case is exemplarily shown in FIG. 39.

Figure 40:
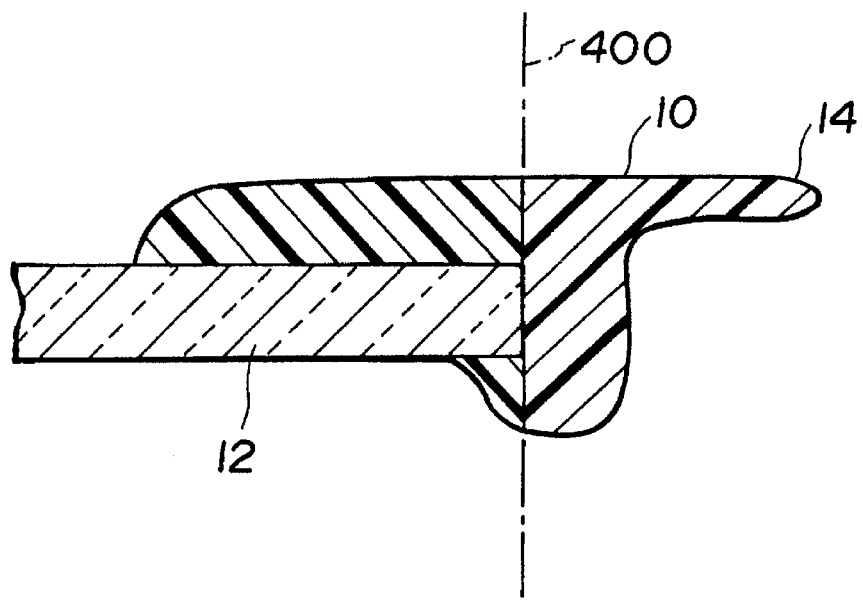
FIGS. 40–41 are views similar to FIG. 39, but showing other sectional shapes of the molding.
Figure 41:
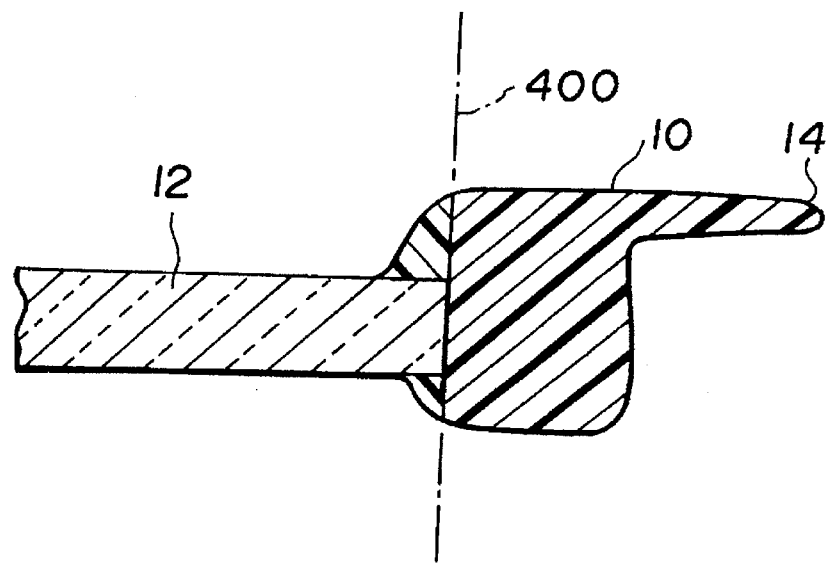

In case that "ti" is longer than "to", the amount of $(\theta/360)\pi to^2$ becomes smaller than the amount of $(\theta/360)\pi ti^2$. In other words, the mount of molding material at the curved corner portion becomes excessive as compared with that at the straight peripheral portion. Therefore, in this case, according to only the factor of the sectional shape of the molding with respect the imaginary surface 400, the value of Mc/Vc is made smaller than Ms/Vs. This case is exemplarily shown in FIG. 40. However, it should be noted that two different materials such as a semi-hard polyvinyl chloride (PVC) and a soft PVC are generally extruded from first and second extruders for forming the major and lip portions of the molding respectively and that, as shown in FIG. 40, the lip portion is always positioned in the outer portion with respect to the imaginary surface 400. Therefore, according to only the factor of the sectional shape of the molding with respect to the imaginary surface 400, the value of the ratio of the extrusion rate (Mc) of the lip-portion forming material at the curved corner portion to the moving speed (Vc) of the extrusion die relative to the window glass at the curved corner portion is always made larger than the value of the ratio of the extrusion rate (Ms) of the lip-portion forming material at the straight peripheral portion to the moving speed (Vs) of the extrusion die relative to the window glass at the straight peripheral portion.

In case that "to" is longer than "ti", the amount of $(\theta/360)\pi to^2$ becomes larger than the amount of $(\theta/360)\pi ti^2$. In other words, the amount of molding material at the curved corner portion becomes insufficient for maintaining a constant sectional shape of the molding. Therefore, in this case, according to only the factor of the sectional shape of the molding with respect the imaginary surface 400, the value of Mc/Vc is made larger than Ms/Vs. This case is exemplarily shown in FIG. 41.

For the purpose of making Mc/Vc different from Ms/Vs, it is optional that Mc is made the same as Ms and Vc is made different from Vs, that Mc is made different from Ms and Vc is made the same as Vs, or that Mc and Vc are respectively made different from Ms and Vs.

Figure 7:
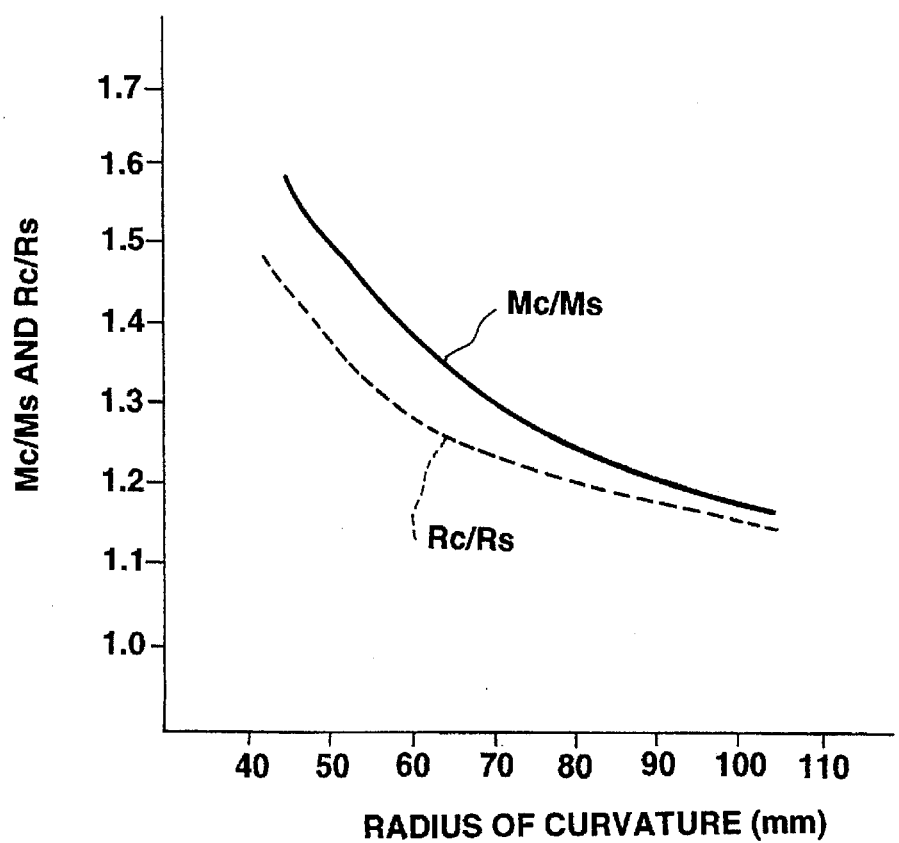
FIG. 7 is a graph showing variations of the extrusion rate ratio (Mc/Ms) and rotational speed ratio (Rc/Rs) as a function of the radius of curvature of a curved corner portion of a window glass, under a condition that Vc is the same as Vs.

With reference to FIG. 7, the control of extrusion, in accordance with the radius of curvature of the curved corner portion of the window glass, which is one factor determining the value of Mc/Vc relative to the value of Ms/Vs, will be described in the following. According to the radius of curvature of the curved portion, in case that Vc is substantially the same as Vs, it is necessary to make Mc larger than Ms. In this case, as shown in FIG. 7, Mc/Ms (extrusion rate ratio) becomes larger than 1, and Rc/Rs (rotational speed ratio) also becomes larger than 1 wherein Rc and Rs represent the rotational speeds of a screw(s) of the extruder at the curved corner portion and at the straight peripheral edge portion of the window glass, respectively. The results of FIG. 7 were obtained by a simulation. As is shown in FIG. 7, it is necessary to make Mc/Ms and Rc/Rs larger as the radius of curvature of the curved corner portion becomes smaller in case that Vc is substantially the same as Vs. In the invention, the extrusion rate ratio is preferably within a range from about 1 to about 2 and more preferably within a range from about 1.2 to about 1.8. However, the extrusion rate ratio may become smaller than 1. In this case, it is necessary to make Vc smaller than Vs by at least a certain degree such that Mc/Vc becomes larger than Ms/Vs.

Figure 43:
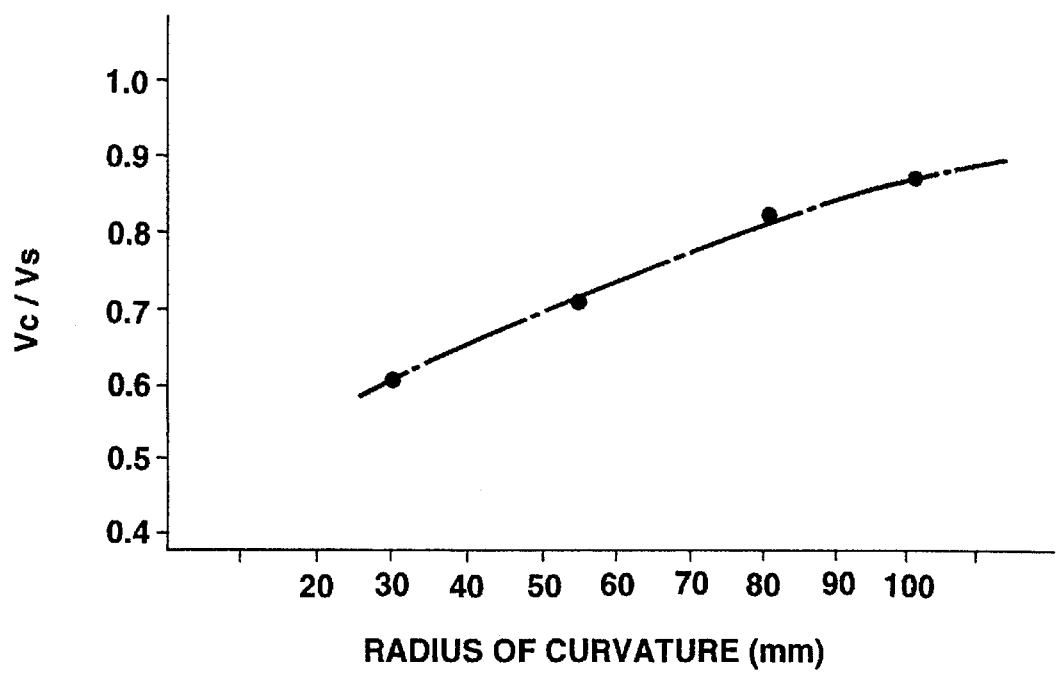
FIG. 43 is a graph showing a variation of the moving speed ratio (Vc/Vs) as a function of the radius of curvature of a curved corner portion of a window glass, under a condition that Mc is the same as Ms.

With reference to FIG. 43, the control of extrusion, in accordance with the radius of curvature of the curved corner portion of the window glass, which is one factor determining the value of Mc/Vc relative to the value of Ms/Vs, will be described in the following. According to the radius of curvature of the curved portion, in case that Mc is substantially the same as Ms, it is necessary to make Vc smaller than Vs. In this case, as shown in FIG. 43, Vc/Vs (moving speed ratio) becomes smaller than 1. As is shown in FIG. 43, it is necessary to make Vc/Vs smaller as the radius of curvature of the curved corner portion becomes smaller in case that Mc is substantially the same as Ms.

In the invention, the extrusion die is moved relative to the window glass such that the extrusion die moves along the peripheral edge portion of the window glass. As will be exemplified hereinafter, it is preferable that the extrusion die is fixed at one position and the window glass is suitably moved relative to the extrusion die. However, according to circumstances, the window glass may be fixed at one position and the extrusion die may be moved along the peripheral edge of the window glass.

Figure 8:
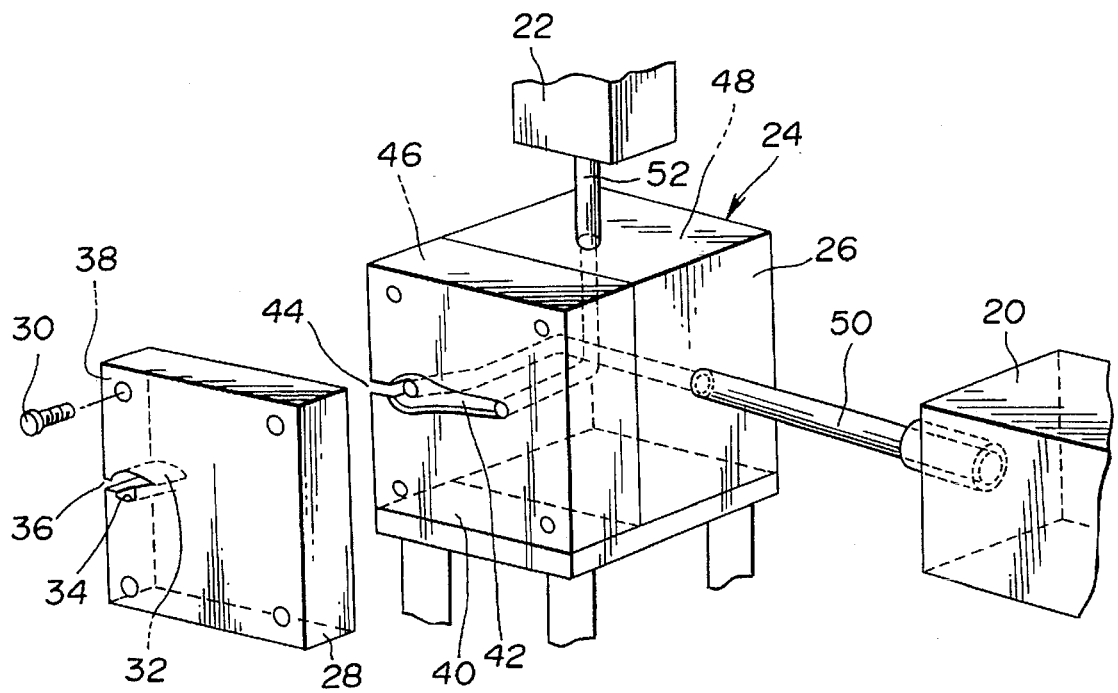
FIG. 8 is an exploded perspective view showing an example of an extrusion die arrangement according to the present invention.

As is seen from FIG. 8, there is provided an example of an extruder arrangement according to the present invention. This extruder arrangement is used to apply first and second materials to a peripheral edge portion of a window glass for forming thereon, for example, major and lip portions of the molding, respectively. In FIG. 8, designated by numerals 20, 22 are first and second extruders for extruding the first and second materials onto a peripheral edge portion of a window glass. The first and second extruders 20, 22 have an extrusion die 24 for imparting certain shapes to the first and second materials. This extrusion die 24 has a major portion 26 and a minor portion 28. The minor portion 28 is exchangeably or detachably attached to the major portion 26 through a plurality of bolts 30 (only one is shown). The minor portion 28 has a void space (cavity) 32 formed therethrough. This cavity 32 has a first opening (orifice) 34 for imparting certain specific shapes to the first and second materials and a second opening 36 which is formed on a side wall surface 38 of the minor portion 28 and sized so as to snugly receive the peripheral edge portion of a window glass. With this, an overflow of the first and second materials from the second opening 36 is substantially suppressed. According to need, the minor portion 28 is replaced by another one having an orifice of a different shape. The major portion 26 is formed on a first wall surface 40 thereof with a void space or cavity 42 for supplying the first and second materials to the cavity 32 of the minor portion 28. The cavity 42 has a side opening 44 which is formed on a side wall surface 46 thereof and sized so as to snugly receive a peripheral edge portion of a window glass. When the extrusion die is assembled, the cavity 42 of the major portion 26 becomes united with the cavity 32 of the minor portion 28, and the side opening 44 of the major portion 26 is aligned to and united with the side opening 36 of the minor portion 28. Although it is not illustrated in FIG. 8 for simplicity, a side opening is formed on the side wall surface 46. This side opening horizontally extends from the side opening 44 to a second wall surface 48 of the major portion 26 so that the peripheral edge portion of a window glass is inserted into the extrusion die 24, without obstacle. A first-material supply passage 50 is provided between the first extruder 20 and the cavity 42 for the purpose of supplying the first material such as vinyl chloride resin from the first extruder 20 to the cavity 42. A second extruder 22 is connected to the cavity 42 through a second-material supply passage 52. By the use of the above-constructed extruder arrangement, the second material is extruded on a peripheral edge portion of a window glass, substantially simultaneously with the extrusion of the first material thereon.

Although not shown in FIG. 8, it is optional to provide two extruders for forming the major portion with two different resins, another extruder for extruding a dam portion of the molding substantially simultaneously with the extrusion of the major and lip portions of the molding, and/or an apparatus for applying a primer (adhesive) substantially simultaneously with the extrusion of the molding.

Figure 9:
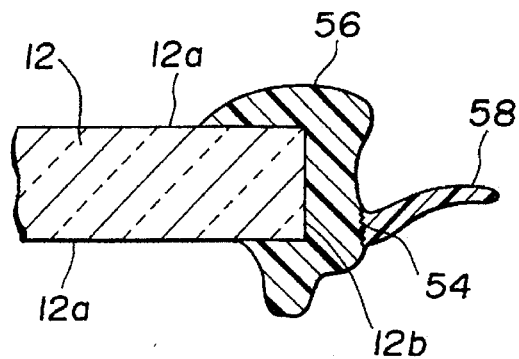
FIGS. 9–10 are views similar to FIG. 3, but showing other examples of the molding.

As is shown in FIG. 9, in case that thermoplastic resins such as PVC are used as the first and second materials in the present invention, a boundary 54 between the major and lip portions 56, 58 of the molding becomes uneven. At the boundary 54, the first and second materials are fused together and blended with each other. With this, adhesion between the major and lip portions 56, 58 is much improved. As well as the use of thermoplastic resins as materials for the major and lip portions 56, 58, a specific extrusion die arrangement according to the invention also contributes to provide the above special boundary 54. In other words, according to the invention, a heated first material having a specifically controlled temperature, for example, within a range from about 125° C. to about 160° C., is applied to the peripheral edge portion of a window glass, and, at substantially the same time as this application, a heated second material having a specifically controlled temperature, for example, within a range from about 125° C. to about 160° C., is extruded onto the first material. Therefore, when the second material is brought into contract with the first material, the temperatures of the first and second materials are maintained as substantially the same as the above specifically controlled temperatures. In conclusion, we have unexpectedly found that, when a thermoplastic resin (the first material) having the above specifically controlled temperature is brought into contact with another thermoplastic resin (the second material) having the above specifically controlled temperature, the boundary 54 therebetween becomes uneven and, at this boundary 54, the first material and the second material are fused together and blended with each other.

It is optional that at least one of the major, lip and dam portions is made of a hard or semi-hard PVC and the rest of these portions is made of a soft PVC. It is preferable to use a hard or semi-hard PVC for the major portion and a soft PVC for the lip portion. With this, the molding becomes superior in shape, durability, function and the like. It is preferable that a soft PVC for the lip portion has a hardness not greater than 75° according to Japanese Industrial Standard (JIS) A hardness. It is more preferable that a soft PVC for the lip portion has a hardness within a range from 60° to 65° according to JIS A hardness. It is optional to use this soft PVC for the major portion of the molding, too.

Figure 10:
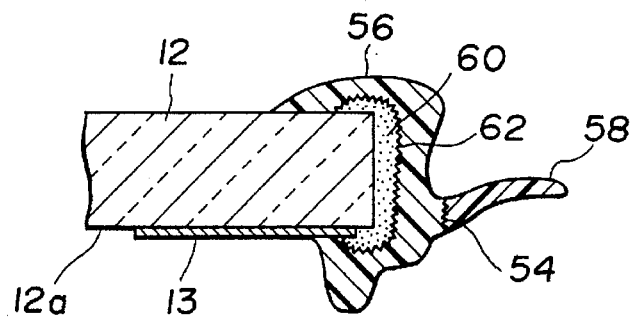

In the above-explanation, the first and second materials are extruded for forming the major and lip portions of the molding, respectively. In this case, an adhesive layer may be formed on the peripheral edge portion of the window glass prior to the extrusions of the first and second materials. However, as is shown in FIG. 10, it is optional that all of an adhesive layer 60 and the major and lip portions 56, 58 of the molding are formed on the peripheral edge portion at substantially the same time, using an extrusion die according to the invention. In this case, a boundary 62 between the adhesive layer 60 and the major portion 56 of the molding becomes uneven, too.

In the invention, examples of an adhesive for the adhesive layer 60 are thermoplastic (hot melt) adhesives such as a copolymerized polyester adhesive (AROMELT FES which is a trade name of TOA GOSEI CHEMICAL INDUSTRY CO., LTD.), a butyl adhesive (MELTRON HB which is a trade name of DIABOND INDUSTRY CO., LTD., or HAMATIGHT HOTMELT M-120 which is a trade name of YOKOHAMA RUBBER CO., LTD.), a mixture of at least two thermoplastic adhesives of the same type, and a mixture of these and a vinyl chloride resin.

In the invention, in case that an optional lip portion is provided, it is optional that each of the major and lip portions of the molding has two different colors, that one of these portions has two different colors and the other has only one color, or that these portions have first and second different colors respectively. In the invention, in case that an optional dam portion is provided, it is optional that each of the major, lip and dam portions of the molding has first and second different colors, or that two of these portions have one color and the other one has another color. Furthermore, in the invention, in case that an optional dam portion is provided, it is optional that the major, lip and dam portions of the molding have first, second and third different colors respectively, that one of these portions has two different colors and the other two of these portions have one color, that two of these portions each have two different colors and the other one has only one color, or that each of these portions has two different colors.

According to the present invention, adhesion strength of the molding to the window glass is much more improved than that of a conventional molding formed on a window glass. According to the invention, the molding formed on a window glass has a substantially uniform cross section, is substantially improved in dimensional precision, and does not have scratches nor creases. More particularly, in case that the molding has an optional lip portion, deformation of the lip portion is substantially suppressed. In the invention, a molding can be formed on a window glass in an automated, labor-reducing and efficient way.

Figure 11:
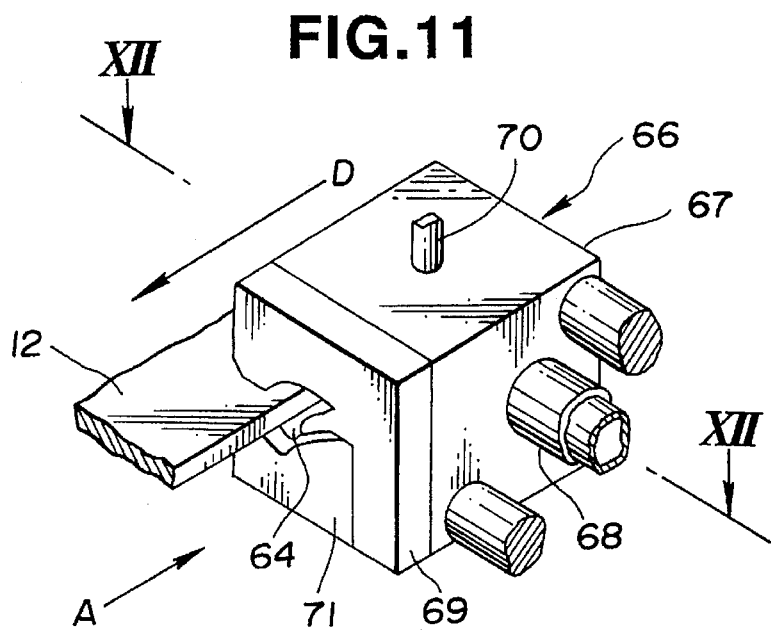
FIG. 11 is a perspective view showing an assembled condition of an extrusion die which is similar to that of FIG. 8.

FIG. 11 is a fragmentary perspective view showing a condition in which a peripheral edge portion of a window glass 12 is inserted in a void space 64 of an extrusion die 66 for extruding a molding on the peripheral edge. This extrusion die 66 is substantially similar to the extrusion die 24 of FIG. 8 in construction. Thus, similar to the extrusion die of FIG. 8, this extrusion die 66 of FIG. 11 has major and minor portions 67, 69. As will be clarified hereinafter, the major portion 67 has a separable lower part (not shown) and the minor portion 65 has also a separable lower part 71. In FIG. 11, designated by numerals 68, 70 are respectively first-material and second-material supply passages which are respectively connected to first and second extruders (not shown). As the window glass 12 is moved in the direction of the arrow "D" of FIG. 11 relative to the extrusion die 66, for example, the major and lip portions of the molding are continuously formed on the peripheral edge of the window glass 12.

Figure 42:
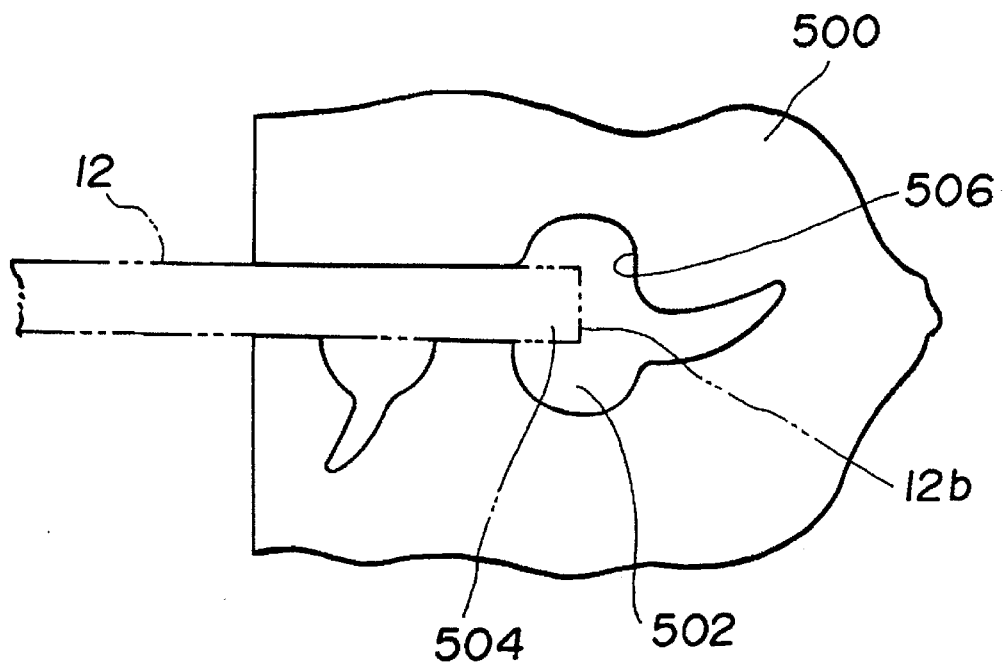
FIG. 42 is a partial elevational view of an extrusion die, which view is similar to a view taken in the direction of the arrow "A" of FIG. 11.

FIG. 42 shows a partial elevational view of an extrusion die 500, which is similar to a view taken in the direction of the arrow "A" of FIG. 11. As is understood from FIG. 42, a cavity 502 of the extrusion die 500 is divided into first and second cavity portions 504, 506 when the peripheral edge portion of the window glass 12 is inserted into the cavity 502. In other words, the first cavity portion 504 is occupied by the peripheral edge portion of the window glass, and the second cavity portion 506 is not occupied at all by the same when the peripheral edge portion of the window glass 12 is inserted into the cavity 502.

Figure 12:
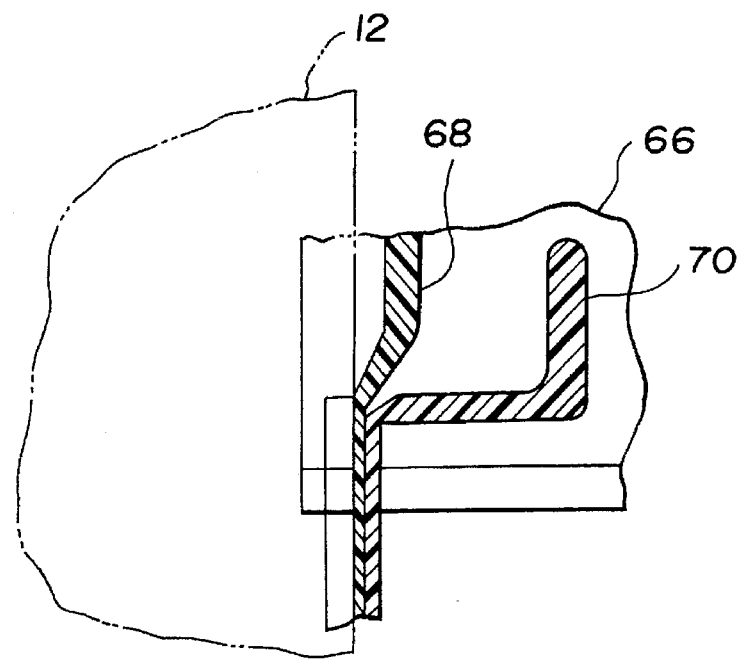
FIG. 12 is a sectional view taken along the line XII—XII of FIG. 11, showing a molding material flowing through first and second passages for the extrusion at a straight peripheral edge portion of a window glass.
Figure 13:
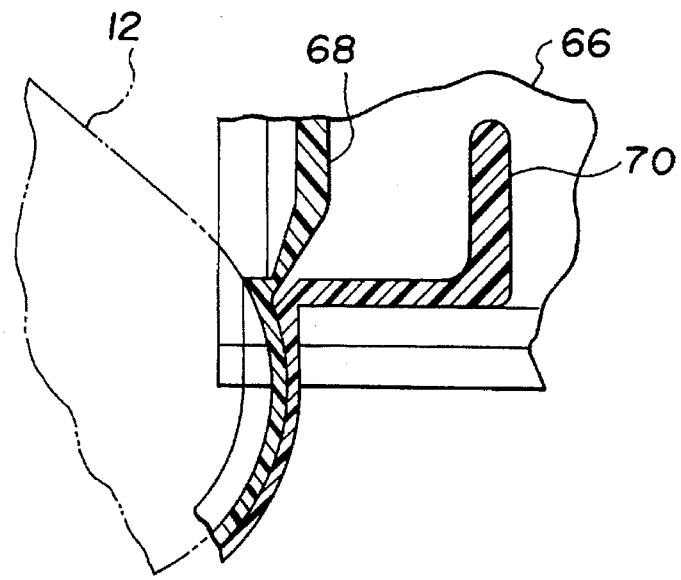
FIG. 13 is a view similar to FIG. 12, but showing the molding material flow for the extrusion at a curved corner portion thereof.

In the following, with reference to FIGS. 12–13 and 42, the control of the extrusion in accordance with the volume variation and internal pressure variation of the second cavity portion 506 of the extrusion die 500, which is one factor determining the value of Mc/Vc relative to the value of Ms/Vs will be described. In case that the extrusion die 500 has major and minor portions similar to the extrusion die of FIG. 8, the cavity 502 refers to the cavity of the minor portion and/or the cavity of the major portion. In FIGS. 12–13, flows of the first and second materials in the passages 68, 70 of the extrusion die 66 are schematically shown. As the extrusion die moves from the straight peripheral portion to the curved corner portion, the volume of the second cavity portion 506 increases and the internal pressure of the second cavity portion 506 decreases at the curved corner portion as compared with the straight peripheral portion of the window glass. Thus, under this condition at the curved corner portion, it is necessary to make Mc/Vc larger than Ms/Vs in accordance with the degree of the volume variation and/or the degree of the internal pressure variation of the second cavity portion 506. With this, even the sectional shape of the lip portion becomes substantially constant at the curved corner portion. As is known, the extrusion rate (Mc, Ms) is adjusted by changing the rotational speed of a screw(s) of the extruder. The control of the moving speed (Vc, Vs) of the extrusion die relative to the window glass may be conducted by a three-dimensional teaching method or an off-line teaching method.

Figure 14:
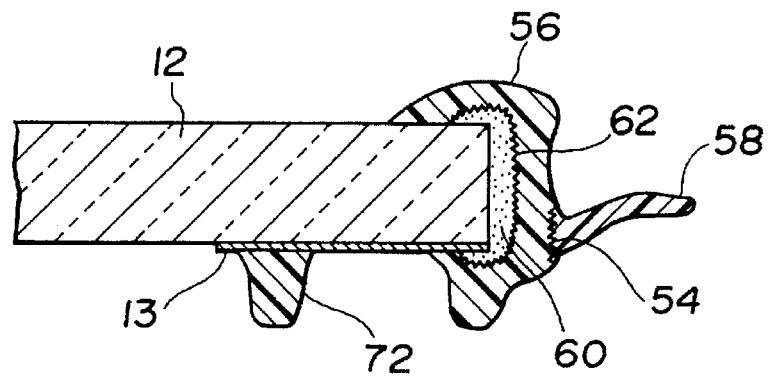
FIGS. 14–18 are views similar to FIG. 3, but showing other examples of the molding.
Figure 15:
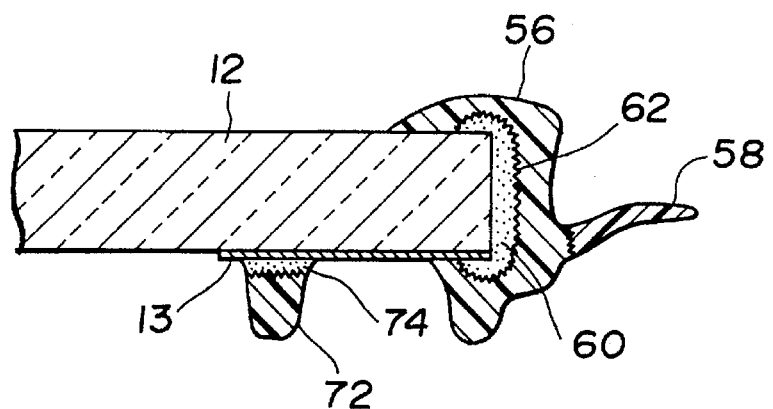
Figure 16:
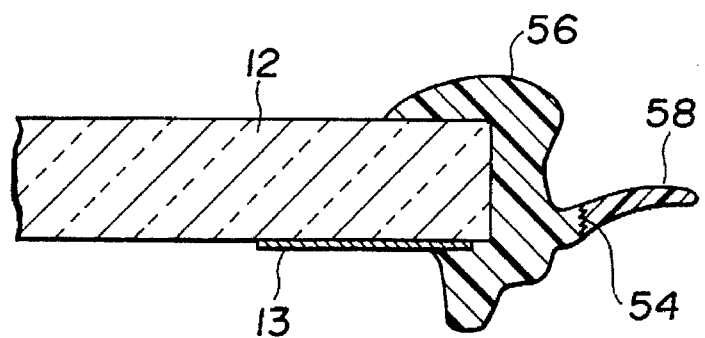
Figure 17:
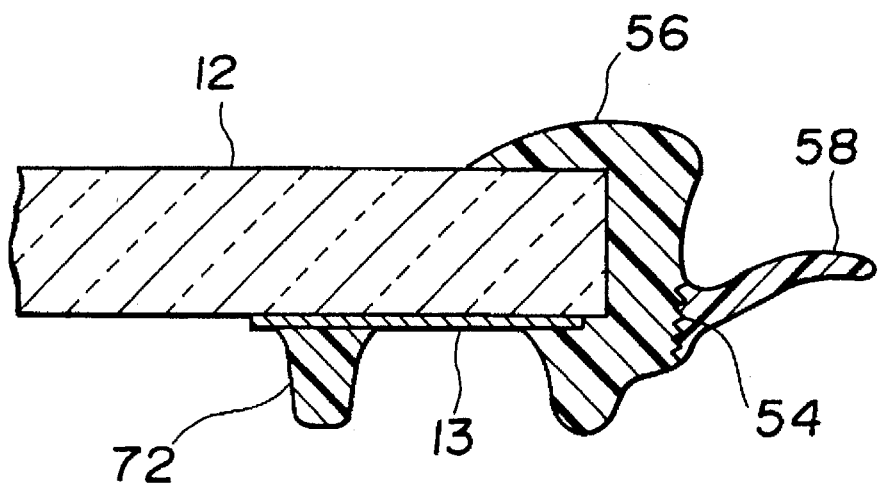
Figure 18:
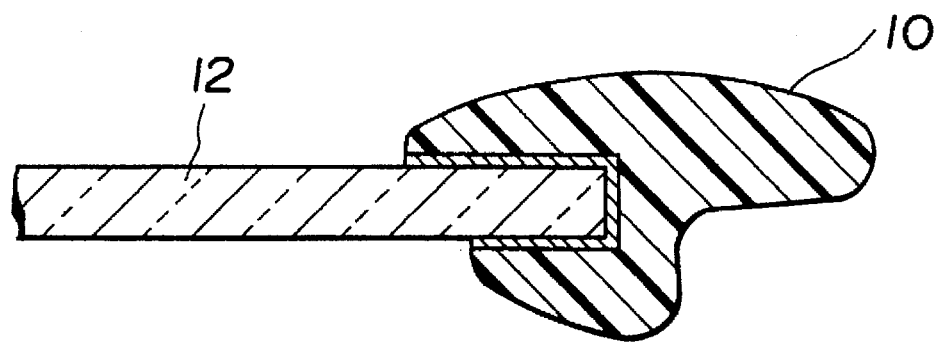
Figure 19:
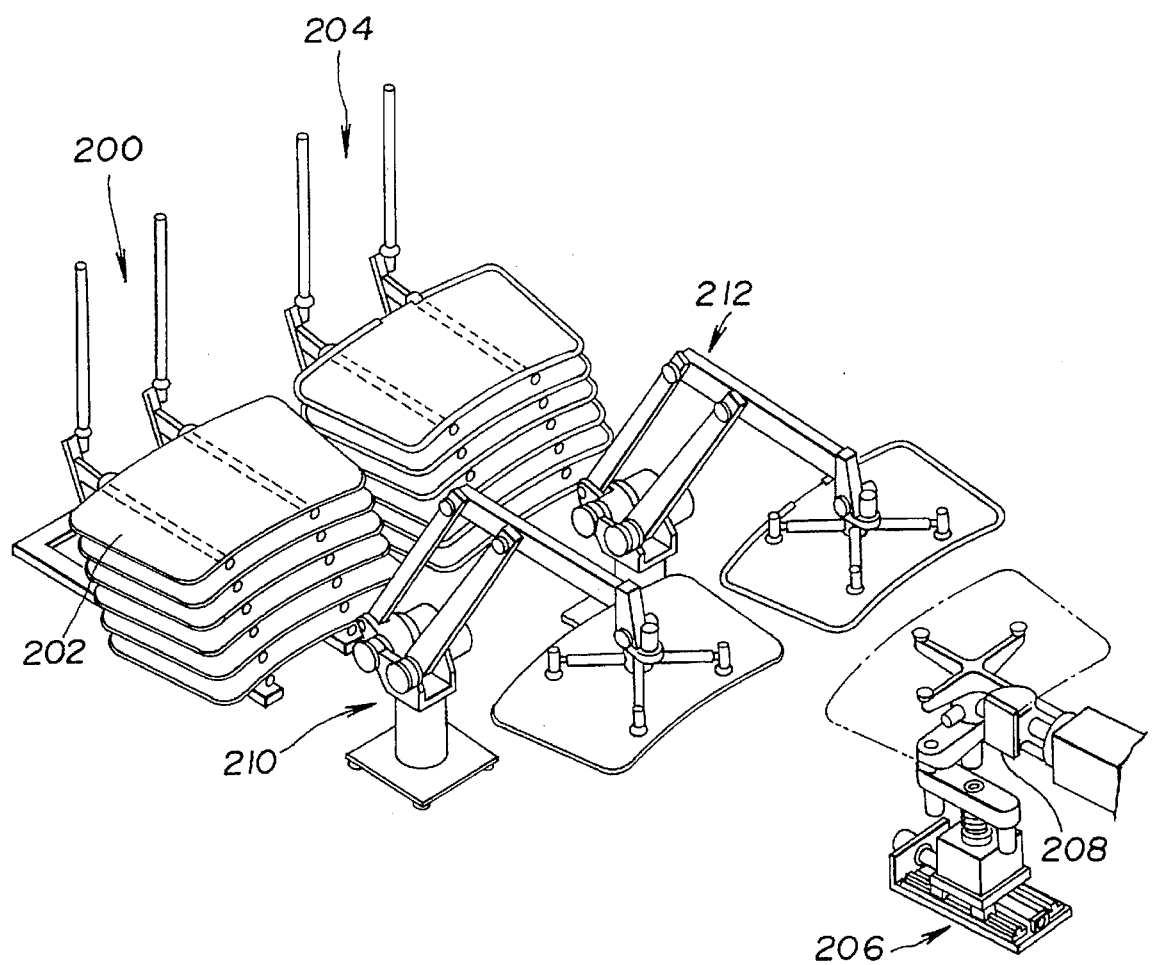
FIG. 19 is a perspective view showing an apparatus arrangement for conducting the extrusion of the present invention.
Figure 20:
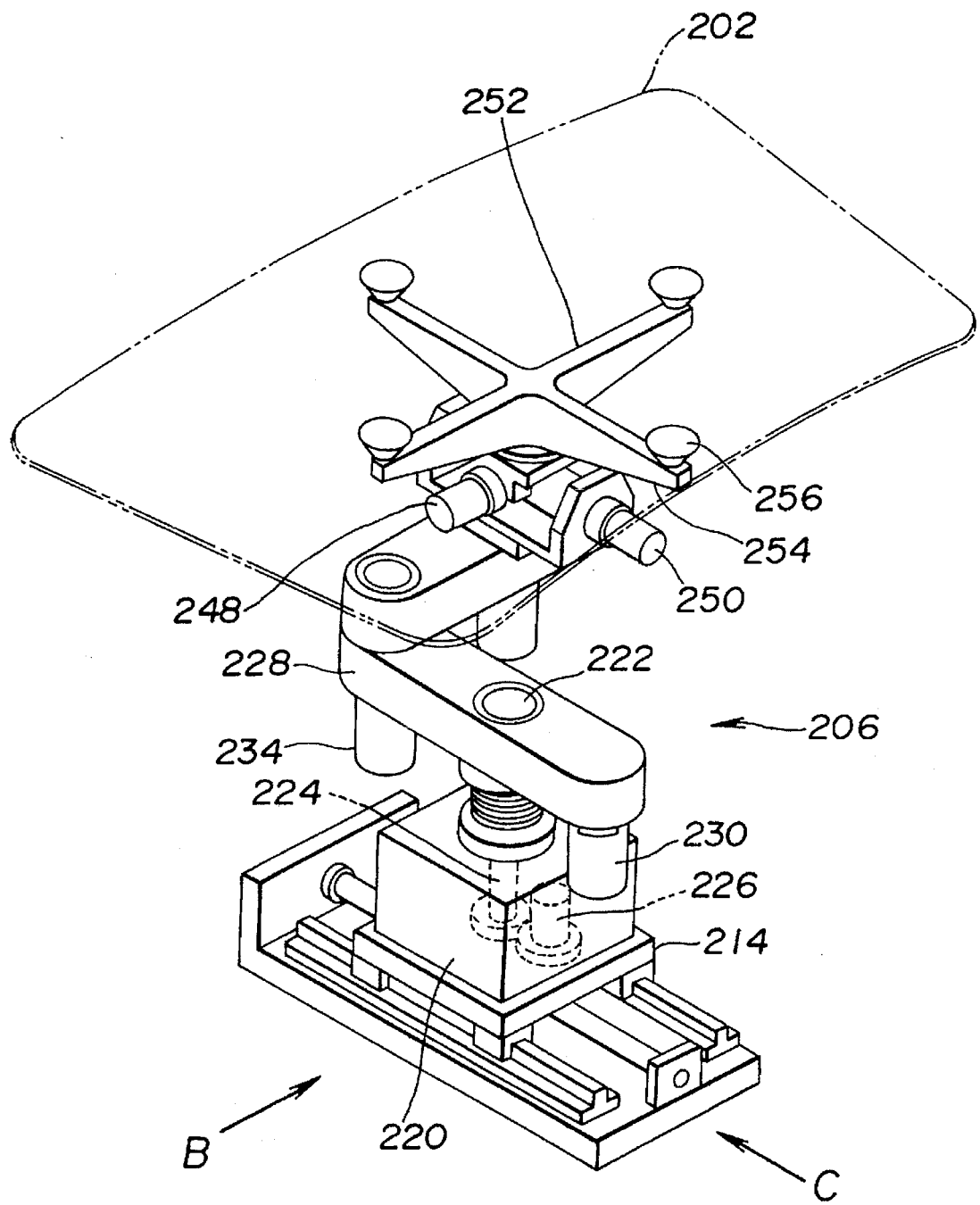
FIG. 20 is a perspective view showing a device for holding thereon a window glass.

Other types of the molding formed on the window glass, which are prepared in accordance with a method of the present invention, are exemplified in FIGS. 14–18. In FIG. 14, the molding has a dam portion 72 formed on a color coating film 13. In FIG. 15, the molding has a dam portion 72 which has been formed on a color coating film 13 substantially simultaneously with the formation of an adhesive layer on the color coating film 13. A window glass with a molding of FIG. 16 is similar to that of FIG. 9, but has a color coating film 13 on a peripheral edge portion of a major surface of the window glass. A window glass with a molding of FIG. 17 is similar to that of FIG. 14, but has an adhesive layer (not shown) which has been applied to the window glass prior to the formation of molding. A molding of FIG. 18 is different from the molding of FIG. 17 in cross sectional shape.

When a window glass having a molding prepared by a method of the present invention is attached to an automotive body, the window glass becomes superior in sealing property, aerodynamics and external appearance.

In the following, an exemplary apparatus arrangement for extruding a molding on a peripheral edge of a window glass in an industrial scale will be described. As is seen from FIG. 19, designated by numeral 200 is a first supporting device for supporting window glass plates 202 on each of which a molding is to be extruded. Designated by numeral 204 is a second supporting device for supporting window glass plates on each of which a molding has been extruded. A holding device 206 is positioned very close to an extrusion die 208 and serves to hold and move each window glass plate relative to the extrusion die 208. A first robotic arm 210 transfers each window glass from the first supporting device 200 to the holding device 206 for extruding a molding thereon. After the extrusion, a second robotic arm 212 transfers each window glass from the holding device 206 to the second supporting device 204.

Figure 21:
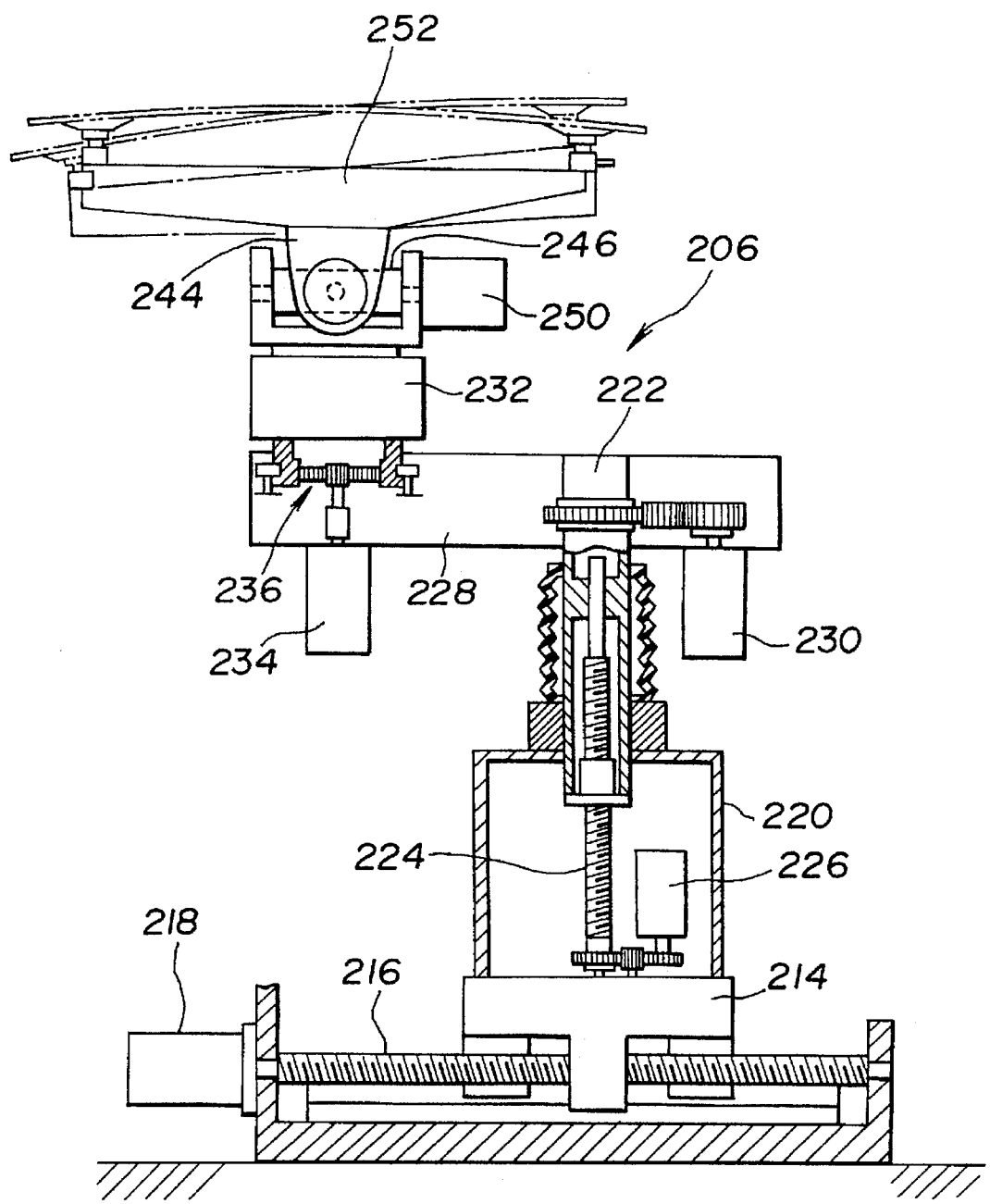
FIG. 21 is an elevational view taken in the direction of the arrow "B" of FIG. 20.

As is seen from FIG. 21, the holding device 206 has a sliding table 214 which is threadedly engaged with a driving shaft 216. This driving shaft 216 is rotated in either direction by a motor 218. By the rotation of this driving shaft 216, the sliding table 214 is slid in either direction, i.e. either left or right in FIG. 21. By the sliding movement of sliding table 214, the peripheral edge of each window glass is inserted into the side openings of the extrusion die or removed therefrom. A supporting base 220 is mounted on the sliding table 214. A cylinder 222 is threadedly engaged with a drive shaft 224. This drive shaft 224 is rotated in either direction by a motor 226. By the rotation of this driving shaft 224, the cylinder 222 is allowed to rise or fall. A first arm is 228 rotatably engaged with the cylinder 222 so that the first arm 228 is rotated by a motor 230 relative to the cylinder 222. A second arm 232 is rotatably engaged with the first arm 228. In fact, the second arm 232 is rotated relative to the first arm 228 by a motor 234 through a planetary gear arrangement 236.

Figure 22:
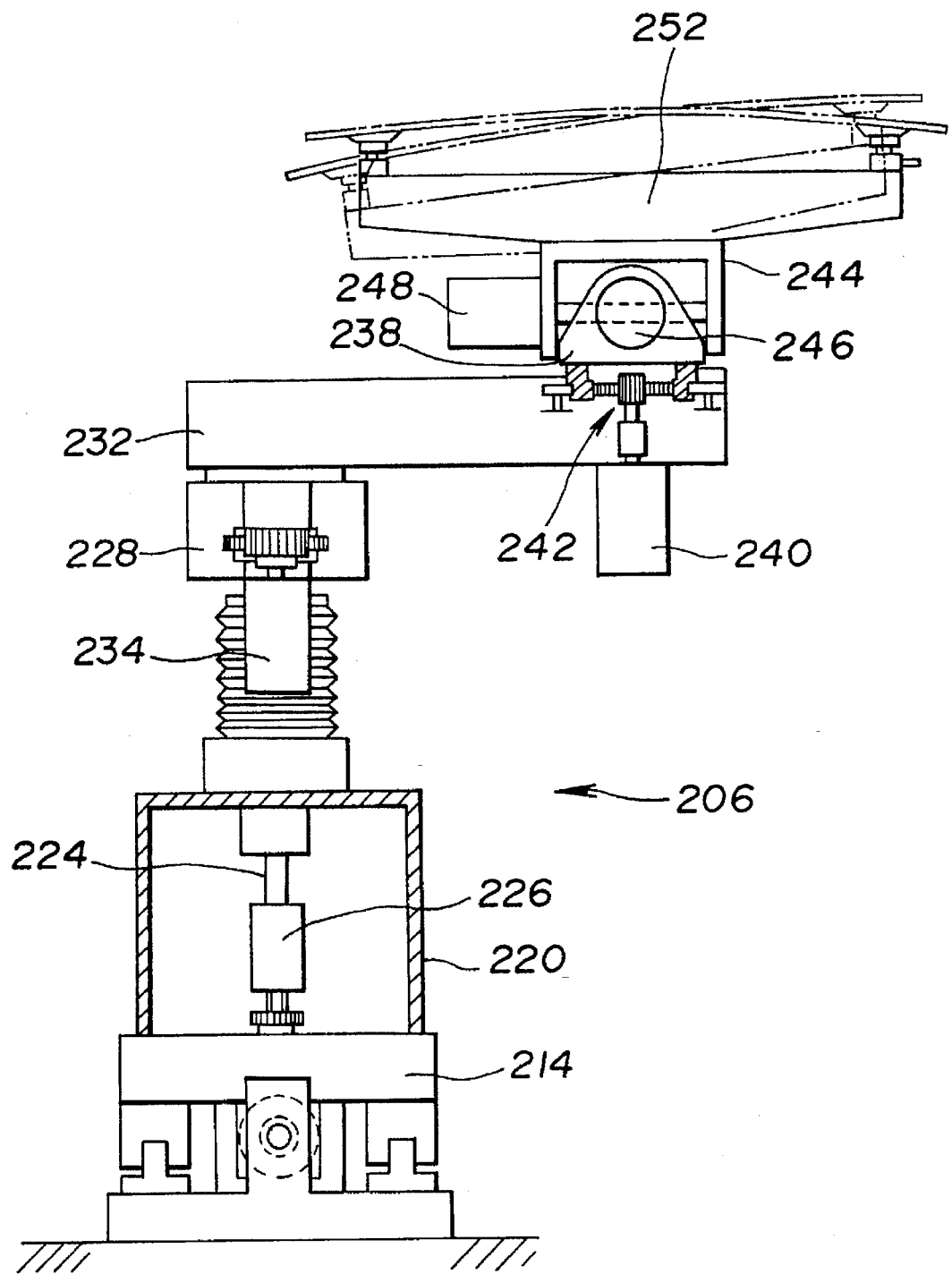
FIG. 22 is an elevational view taken in the direction of the arrow "C" of FIG. 20.
Figure 23:
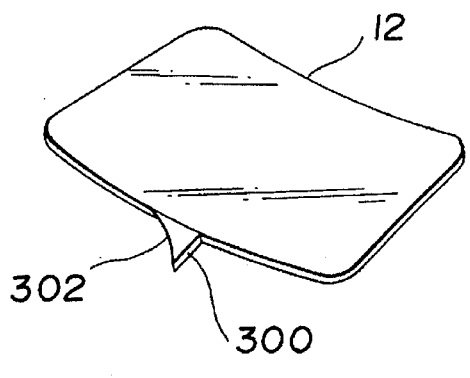
FIGS. 23–26 are views showing an example of sequential steps for conducting the extrusion of a molding using a guide member.
Figure 24:
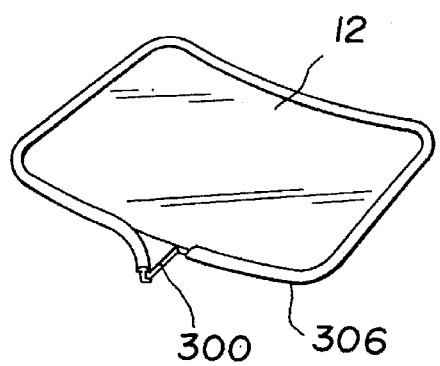
Figure 25:
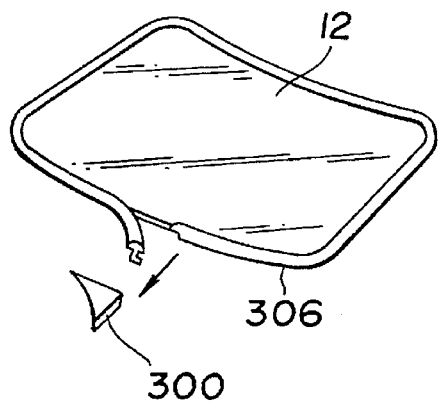
Figure 26:
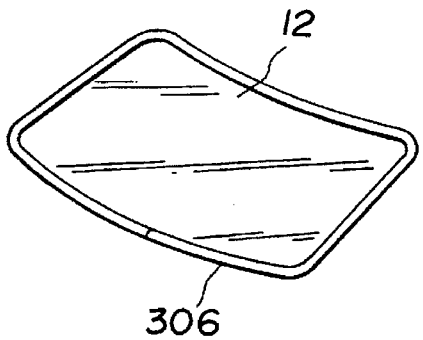

As is seen from FIG. 22, a rotatable base 238 is rotatably engaged with the second arm 232. In fact, the rotatable base 238 is rotated relative to the second arm 232 by a motor 240 through a planetary gear arrangement 242. A tiltable base 244 is tiltably supported on the rotatable base 238 through a cross 246. In fact, the tiltable base 244 is tilted by a first motor 248 in either the left or right direction in FIG. 21, as illustrated. Furthermore, the tiltable base 244 is tilted by a second motor 250 in either the left or right direction in FIG. 22, as illustrated. A window glass holding member 252 is fixed to the tiltable base 244. This holding member 252 comprises four arms 254 each having a vacuum cup 256.

Operation of the above extruder arrangement will be briefly explained in the following. At first, a window glass plate 202 is transferred from the first supporting device 200 to the holding device 206. That is, this glass plate 202 is placed on the vacuum cups 256 of the holding device 206. Then, vacuum is applied to the cups 256 to securely hold thereon the glass plate 202. Then, the peripheral edge of the glass plate is inserted into the side openings of the extrusion die 208 by sliding the table 214 toward the extrusion die 208. Then, while the glass plate 202 is moved by the holding device 206 in a precisely controlled manner, the adhesive layer and the molding are formed on the peripheral edge of the glass plate 202, as explained above. After the completion of the formation of the adhesive layer and the molding, the glass plate is transferred from the holding device 206 to the second supporting device 204 for shipping.

Figure 29:
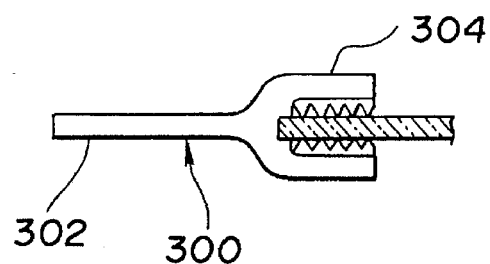
FIG. 29 is a sectional view showing the guide member of FIG. 28.
Figure 30:
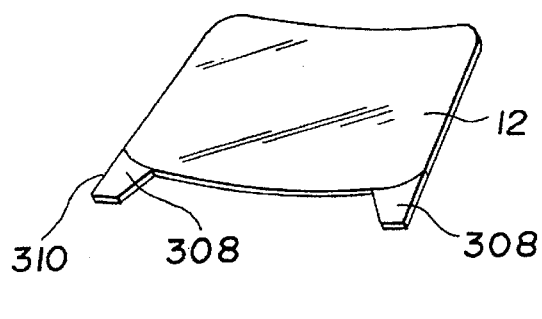
FIGS. 30–33 are views showing another example of sequential steps for conducting the extrusion of a molding using two guide members.
Figure 31:
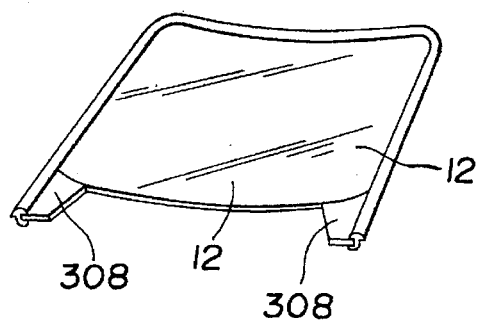
Figure 32:
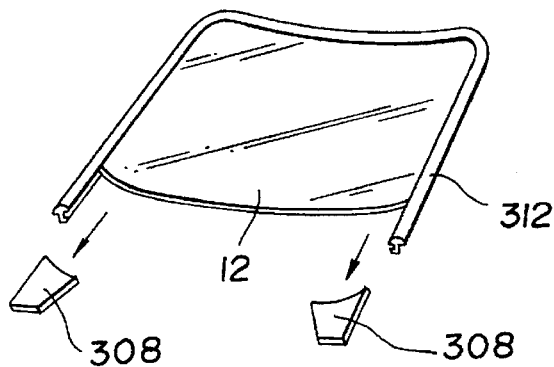
Figure 33:
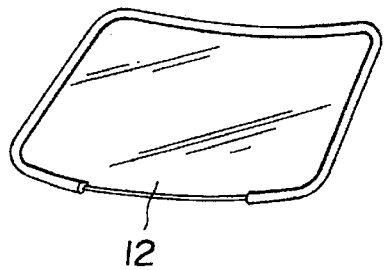
Figure 34:
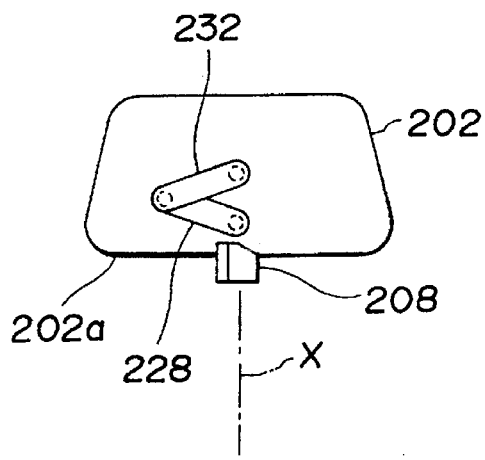
FIGS. 34–36 are schematical plan views showing sequential movements of a window glass relative to an extrusion die of the present invention, during the extrusion.

In the invention, as is shown in FIGS. 23–33, the extrusion of the molding onto a peripheral edge portion of a window glass may be conducted using an optional guide member(s). With this optional guide member, both end portions of the molding are improved in finish. In other words, the both end portions do not have creases nor separate from the peripheral edge portion of the window glass. As is seen from FIGS. 28 and 29, the guide member 300 has a guide portion 302 made of a heat resistant resin and a holding portion 304 made of an elastic hard resin. The guide portion 302 has a thickness which is the same as that of the window glass 12. The guide member 300 which is detachably attached to a peripheral edge portion of a window glass 12 through the holding portion 304. In fact, as is shown in FIG. 29, the peripheral edge portion is tightly held or cramped by the holding portion 304.

Figure 27:
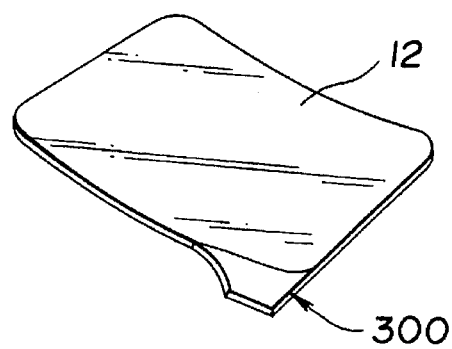
FIG. 27 is a view similar to FIG. 23, but showing another guide member.
Figure 28:
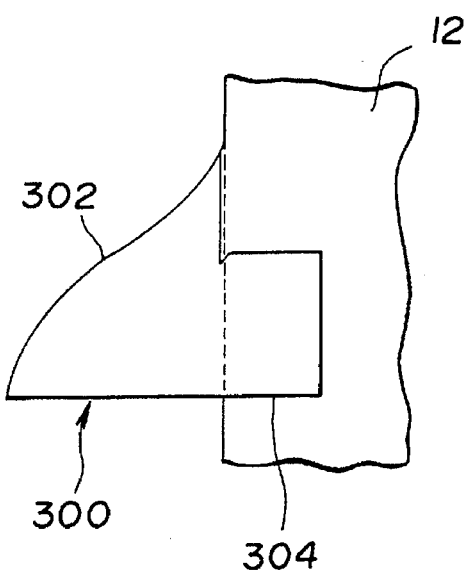
FIG. 28 is a plan view showing a guide member attached to a peripheral edge portion of a window glass.

With reference to FIGS. 23–26, a method for conducting the extrusion using the guide member in case that the extrusion starts at a middle portion of a major straight peripheral portion of a window glass will be briefly described in the following. At first, the guide member 300 is attached to the middle portion of a major straight peripheral portion of a window glass 12 (see FIG. 23). Then, a peripheral edge of the guide portion 302 of the guide member 300 is inserted into an extrusion die (not shown) according to the invention, and then the extrusion is conducted so as to form a molding 306 on a peripheral edge portion of a window glass 12 (see FIG. 24). Then, the guide member 300 is detached from the window glass 12 and an end portion of the molding 306 (see FIG. 25). Then, this end portion is firmly attached to the window glass 12 by heating this end portion (see FIG. 26). As is shown in FIG. 27, the guide member 300 may take another shape and be attached to a curved corner portion of the window glass 12 for conducting the extrusion. As compared with the extrusion without the guide member 300, an end portion of the molding 306 is much improved in finish. Because the thickness of the guide portion 302 of the guide member 300 is the same as that of the window glass 12, the extrusion die moves very smoothly along the peripheral edge of the guide portion 302 and then along the peripheral edge of the window glass 12.

With reference to FIGS. 30–33, another method for conducting the extrusion using two guide members, in case that the molding is to cover only a major part of a peripheral edge portion of a window glass, will be briefly described in the following. At first, two guide members 308 are attached to curved corner portions of a window glass 12 (see FIG. 30). Then, a peripheral edge of a guide portion 310 of the guide member 308 is inserted into an extrusion die (not shown) according to the invention, and then the extrusion is conducted so as to form a molding 312 on a peripheral edge portion of a window glass 12 (see FIG. 31). Then, the guide members 308 are detached from the window glass 12 and both end portions of the molding 312 (see FIG. 32). Then, these end portions are firmly attached to the window glass 12 by heating these end portions (see FIG. 33).

The following nonlimitative examples are illustrative of the present invention.

EXAMPLE 1

In this example, a molding having major and lip portions was extruded on a peripheral edge portion of a window glass, using the extrusion die arrangement shown in FIG. 8 in the following manner. In fact, the major and lip portions of the molding were respectively extruded from first and second extruders on the peripheral edge to which a primer (adhesive) had been applied.

As the window glass, an automotive float glass plate having a length of about 1350 mm, a width of about 950 mm and a thickness of about 3.5 mm which had been suitably bent was used. Two different types of vinyl chloride resin were used for extruding the major and lip portions of the molding, respectively. The temperatures of the first and second extruders and the extrusion die were respectively maintained within a range from about 125° C. to about 160° C. during the extrusion so as to heat the molding materials at a temperature within this range. The first extruder had a single screw having a ratio of its length (L) to its diameter (D) of 13. The second extruder had twin screws each having a L/D of 25. A flexible pipe made of TEFLON (a trade name), covered with a stainless steel net and then with a band heater, was used for connecting each of the first and second extruders to the cavity 42 (see FIG. 8). In fact, the flexible pipes were heated by the band heater during the extrusion so as to suitably heat the molding materials. The first molding material was extruded from the first extruder with an extrusion rate (i.e. extrusion length per unit time) of 40 m/min, and the second molding material was extruded from the second extruder with an extrusion rate of 20 m/min.

The thus extruded and cooled down major portion of the molding was a semi-hard polyvinyl chloride (PVC) having a hardness of about 93° (SE-793H) according to Japanese Industrial Standards (JIS) A hardness, and the thus extruded and cooled down lip portion of the molding was a soft (plasticized) PVC having a hardness of about 65° (LE-608A-19) according to JIS A hardness. The window glass after the extrusion did not have scratches. Furthermore, the molding was superior in surface finish and dimensional precision. The molding did not have scratches nor creases.

While the molding materials were respectively extruded from the first and second extruders onto the peripheral edge of the window glass, the window glass was specifically moved relative to the extrusion die, using a device for holding the window glass (see FIGS. 34–36), in the following manner.

At first, the sliding table 214 of the holding device 206 was moved in the left direction of FIG. 21 to a certain position for the purpose of taking a sufficient space between the window glass 202 and the extrusion die 208. Then, under this condition, the window glass 202 was placed on the suction cups 256 of the holding member 252 of the holding device 206 such that the first straight edge 202a of the window glass 202 is arranged perpendicular to a longitudinal axis X of the extrusion die 208 (see FIG. 34). Then, vacuum was applied to the suction cups 256 for fixedly holding the window glass 202 thereon. Then, the second motor 250 was suitably energized to always keep the first straight edge 202a of the window glass 202 horizontal. Then, the height of the cylinder 222 was suitably adjusted by rotating the driving shaft 224 so as to put the first straight edge 202a of the window glass 202 at a height where the first straight edge 202a of the window glass 202 is smoothly put into a cavity of the extrusion die 208. Then, the sliding table 214 was moved in the right direction of FIG. 21 so as to insert a middle portion of the first straight edge 202a into the cavity of the extrusion die 208 by a certain predetermined degree (see FIG. 34).

Figure 35:
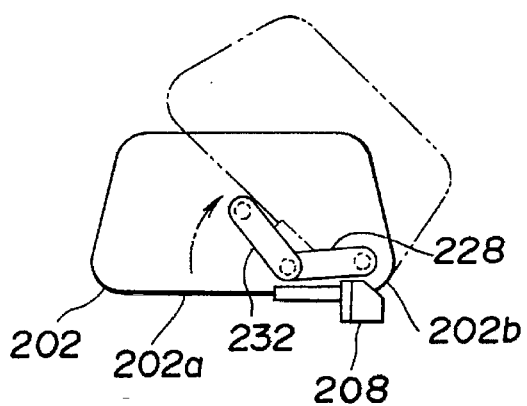
Figure 36:
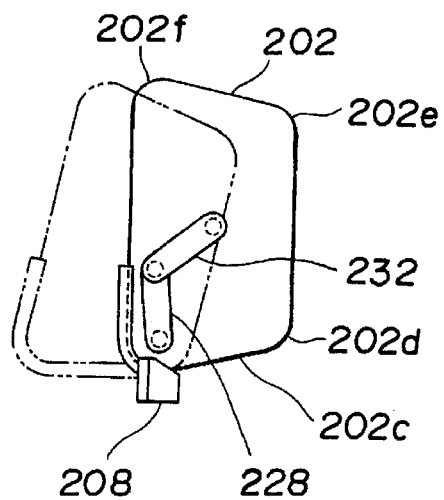

Then, as is shown in FIG. 35, the first and second arms 228, 232 were respectively suitably rotated during the extrusion so as to move the first straight edge 202a of the window glass 202 relative to the extrusion die 208 at the same speed as the extrusion rate, while a portion of the first straight edge 202a of the window glass 202 is kept inserted in the void space of the extrusion die 208. As is shown in FIG. 35, when the extrusion die 208 reached a first curved corner portion 202b of the window glass 202, which portion 202b has a radius of curvature of 60 mm, the rotation of the rotatable base 238 was started as well as the rotations of the first and second arms 228, 232 so as to provide an appropriate extrusion from the extrusion die 208 onto the first curved corner portion 202b at a constant rate. During the extrusion on the first curved corner portion 202b, the extrusion rate at the first curved corner portion 202b was increased from the extrusion rate at the first straight edge 202a by increasing the rotation speed of the screws of the extruders with reference to the result shown in FIG. 7 such that Mc/Ms was adjusted to about 1.4 wherein Mc and Ms represent the extrusion rates at the first corner portion 202b and the lower straight edge portion 202a, respectively. This value of Mc/Ms was determined in accordance with the radius of curvature and the shape of the first curved corner portion 202b, the volume variation and pressure variation of the cavity of the extrusion die 208. During the extrusion on the first curved corner portion 202b, the first curved corner portion 202b was always kept horizontal by the rotations of the first and second motors 248, 250. Then, as is shown in FIG. 36, when the extrusion die 208 reaches the second straight edge 202c of the window glass 202, the extrusion rate was decreased from the extrusion rate at the first curved portion 202b to the extrusion rate at the first straight edge 202a. During the extrusion onto the second straight edge 202c, the first and second arms 228, 232 were suitably rotated so as to move the extrusion die 208 along the second straight edge 202c. After that, when the extrusion die 208 reached the second curved corner portion 202d having a radius of curvature of 100 mm, the extrusion rate was increased from the extrusion rate at the second straight edge 202c with reference to the result shown in FIG. 7 such that Mc/Ms was about 1.2 wherein Mc represents the extrusion rate at the second curved corner portion 202d and Ms represents the extrusion rate of the first or second straight edge 202a or 202c. Thus, the extrusions at the third and forth curved corner portions 202e, 202f were respectively conducted in the same ways as the extrusions at the second and first curved corner portions 202d, 202b. After the completion of the extrusion for the entire peripheral portion of the window glass, with reference to FIG. 11, the separable lower portion 71 of the minor portion 69 and the separable lower portion (not shown) of the major portion 67 of the extrusion die 66 were lowered so as to allow the window glass having the molding thereon to separate from the extrusion die 66. Then, the sliding table 214 was moved in the left direction of FIG. 21. Then, the window glass having the molding thereon was taken out for shipping. The thus formed molding are shown in FIGS. 1 and 9. This molding could substantially suppress deformation of the lip portion, was superior in dimensional precision, and did not have scratches nor creases. The boundary between the major portion and the lip portion of the molding was uneven. At this boundary, the materials of the major and lip portions were fused together and blended with each other. Thus, adhesion strength between the major portion and the lip portion was superior.

EXAMPLE 2

In this example, Example 1 was slightly modified as follows. At first, with reference to FIGS. 3 and 34–36, an automotive float glass plate having a radius of curvature of about 50 mm for the first and fourth curved corner portions 202b, 202f and that of about 80 mm for the second and third curved corner portions 202d, 202e was coated at a peripheral portion of a bottom surface thereof with a conventional black coating film 13. Then, with reference to FIG. 3, an adhesive layer 60 and major and minor portions 16, 14 of the molding 10 were extruded on the peripheral portion of the window glass 12 substantially at the same time. Semi-soft PVC, soft PVC and a thermoplastic hot melt adhesive were respectively used for forming the major and lip potions and the adhesive layer. The formed window glass having the molding is shown in FIG. 3 and had superior characteristics similar to Example 1.

EXAMPLE 3

In this example, Example 1 was slightly modified as follows. An automotive float glass which is the same as that of Example 2 was used. A semi-soft PVC was used for forming the major portion of the molding, and a semi-soft PVC and a soft PVC were used for forming the lip portion of the molding. Similar to Example 1, the formed window glass having the molding had superior characteristics.

EXAMPLE 4

In this example, Example 1 was slightly modified as follows. Only the material for forming the lip portion was changed to a semi-soft PVC and a soft PVC. Similar to Example 1, the formed window glass having the molding had superior characteristics.

EXAMPLE 5

In this example, Example 4 was slightly modified as follows. A dam portion of a semi-soft PVC was additionally formed, through an adhesive layer, on a black coating film at a peripheral portion of the window glass so as to position the dam portion away from the major and lip portions. Similar to Example 1, the formed window glass having the molding had superior characteristics.

EXAMPLE 6

In this example, Example 2 was slightly modified as follows. A dam portion of a semi-soft PVC was additionally formed, directly on a black coating film at a peripheral portion of the window glass. Similar to Example 1, the formed window glass having the molding had superior characteristics.

EXAMPLE 7

In this example, Example 1 was slightly modified as follows. An automotive float glass plate which is the same as that of Example 2 was used. A dam portion of which material is the same as that of the adhesive layer was additionally formed. Similar to Example 1, the formed window glass having the molding had superior characteristics.

EXAMPLE 8

In this example, Example 3 was slightly modified as follows. A dam portion of which material is the same as that of the major portion of the molding was additionally formed. Similar to Example 1, the formed window glass having the molding had superior characteristics.

EXAMPLE 9

In this example, Example 1 was slightly modified as follows. Only a peripheral portion of the bottom surface of a window glass was coated with a primer (adhesive). The minor portion of the extrusion die was replaced by another one having a different shape of the orifice 34 (see FIG. 8). The formed window glass having the molding is shown in FIG. 5 and had superior characteristics similar to Example 1.

EXAMPLE 10

In this example, Example 1 was slightly modified as follows. A peripheral portion of the bottom surface of a window glass was coated with a conventional black coating and then with a primer (adhesive). The minor portion of the extrusion die was replaced by another one having a different shape of the orifice 34 (see FIG. 8). The formed window glass having the molding is shown in FIG. 6 and had superior characteristics similar to Example 1.

EXAMPLE 11

In this example, Example 1 was slightly modified as follows. A peripheral portion of a window glass was coated with a primer (adhesive). The minor portion of the extrusion die was replaced by another one having a different shape of the orifice 34 (see FIG. 8). The formed window glass having the molding is shown in FIG. 4 and had superior characteristics similar to Example 1.

What is claimed is:

1. A method of producing a platelike article having a molding formed on a peripheral edge of the platelike article, using an extrusion die having a cavity for supplying first and second thermoplastic molding materials to the peripheral edge, the peripheral edge having a straight portion and a curved corner portion, the cavity having an orifice of a certain shape for imparting the certain shape to the first and second thermoplastic molding materials, the cavity having first and second cavity portions, the method comprising the steps of:

(a) inserting the peripheral edge of the platelike article into the cavity of the extrusion die such that the first cavity portion is occupied by the peripheral edge;

(b) supplying the first and second thermoplastic molding materials to the second cavity portion;

(c) moving the extrusion die relative to the platelike article, with a moving speed of "Vs" at the straight portion and with a moving speed of "Vc" at the curved corner portion, while the peripheral edge is kept inserted in the cavity; and (d) extruding the first and second thermoplastic molding materials substantially simultaneously from the second cavity portion through the orifice onto the peripheral edge so as to respectively form first and second molding portions of the molding on the peripheral edge, with an extrusion rate of "Ms" at the straight portion and with an extrusion rate of "Mc" at the curved corner portion, while the steps (b) and (c) are conducted, the first and second molding portions bordering on each other, wherein the steps of (b), (c) and (d) are respectively controlled in accordance with a radius of curvature of the curved corner portion and/or with a sectional shape of the molding such that Mc/Vc becomes different from Ms/Vs.

2. A method according to claim 1, wherein the platelike article has first and second major surfaces which are opposed to each other and an edge surface connecting the first and second major surfaces with each other, and wherein the peripheral edge portion is one selected from the group consisting of first, second and third members, the first member consisting of a peripheral portion of each of the first and second major surfaces and the edge surface, the second member consisting of a peripheral portion of one of the first and second major surfaces and the edge surface, and the third member consisting of a peripheral portion of one of the first and second major surfaces.

3. A method according to claim 2, wherein the first and second molding portions of the molding respectively are a major portion thereof and a lip portion extending from the major portion.

4. A method according to claim 1, wherein the steps of (b), (c) and (d) are respectively controlled in accordance with a volume increase of the second cavity portion at the curved corner portion such that Mc/Vc becomes larger than Ms/Vs.

5. A method according to claim 1, wherein the steps of (b), (c) and (d) are respectively controlled in accordance with a sectional shape of the molding such that Mc/Vc becomes different from Ms/Vs.

6. A method according to claim 2, wherein the steps of (b), (c) and (d) are respectively controlled in accordance with both of a volume increase of the second cavity portion at the curved corner portion and a sectional shape of the molding with respect to an imaginary surface on a plane of the edge surface such that Mc/Vc becomes different from Ms/Vs.

7. A method according to claim 3, wherein the steps of (b), (c) and (d) for forming the lip portion are respectively controlled such that Mc/Vc becomes larger than Ms/Vs.

8. A method according to claim 1, wherein the steps of (b), (c) and (d) are respectively controlled such that Mc is larger than Ms.

9. A method according to claim 8, wherein the steps of (b) and (d) are respectively controlled in accordance with the radius of curvature of the curved corner portion such that Mc is different from Ms.

10. A method according to claim 9, wherein the steps of (b) and (d) are respectively controlled in accordance with the radius of curvature of the curved corner portion such that Mc/Ms becomes larger than 1 and smaller than 2 and that Mc/Ms is decreased as the radius of curvature of the curved corner portion increases.

11. A method according to claim 1, wherein the step of (c) is controlled such that Vc becomes smaller than Vs.

12. A method according to claim 11, wherein the step of (c) is controlled in accordance with the radius of curvature of the curved corner portion such that Vc is different from Vs.

13. A method according to claim 1, wherein the steps of (b), (c) and (d) are controlled in accordance with a volume variation of the second cavity portion and/or an internal pressure variation of the second cavity portion.

14. A method according to claim 1, wherein, in the step (c), the platelike article is moved relative to the extrusion die fixed at one position.

15. A method according to claim 3, wherein the major portion and the lip portion of the molding have first and second colors.

16. A method according to claim 15, wherein the major portion is made of a material selected from the group consisting of hard vinyl chloride resins, semi-hard vinyl chloride resins and soft vinyl chloride resins, and wherein the lip portion is made of a soft vinyl chloride resin.

17. A method according to claim 3, wherein the molding further comprises a dam portion.

18. A method according to claim 17, wherein the major portion, the lip portion and the dam portion have at least two colors.

19. A method according to claim 17, wherein the major portion, the lip portion and the dam portion have at least three colors, or at least one of the major portion, the lip portion and the dam portion has one single color and the others have two colors.

20. A method according to claim 17, wherein at least one of the major portion, the lip portion and the dam portion is made of a material selected from the group consisting of hard vinyl chloride resins, semi-hard vinyl chloride resins and soft vinyl chloride resins, and the others of the major portion, the lip portion and the dam portion are made of a soft vinyl chloride resin.

21. A method according to claim 16, wherein, during the step (d), each of the first and second molding materials is heated at a certain controlled temperature in the cavity of the extrusion die so that a boundary between the major portion and the lip portion has a rough surface and that the first and second molding materials are fused together at the boundary.

22. A method according to claim 21, wherein the certain controlled temperature is within a range from about 125° to about 160° C.

23. A method according to claim 8, wherein the steps of (b), (c) and (d) are respectively controlled such that Mc is larger than Ms under a condition that Vc is the same as Vs.

24. A method according to claim 11, wherein the step of (c) is controlled such that Vc becomes smaller than Vs under a condition that Mc is the same as Ms.

25. A method of producing a platelike article having an adhesive layer and a molding, said adhesive layer being formed on a peripheral edge of said platelike article, said molding covering said adhesive layer and being formed on said peripheral edge, said peripheral edge having a straight portion and a curved corner portion, using an extrusion die comprising a first space for supplying an adhesive to said peripheral edge and a second space for supplying a molding material to said peripheral edge, said method comprising the steps of:

(a) inserting said peripheral edge into said first and second spaces;

(b) moving said platelike article relative to said extrusion die, with a moving speed of "Vc" at the curved corner portion, while said peripheral edge is kept inserted in said first and second spaces;

(c) applying said adhesive form said first space to said peripheral edge so as to form said adhesive layer thereon, said adhesive being a thermoplastic hot melt adhesive; and (d) extruding said molding material from said second space onto said adhesive layer substantially simultaneously while the step (c) is conducted, with an extrusion rate of "Ms" at the straight portion and with an extrusion rate of "Mc" at the curved corner portion, while the steps (b) and (c) are conducted, said molding material being a thermoplastic resin, wherein said first and second spaces are so arranged relative to each other such that said molding and said adhesive layer are substantially simultaneously formed on said peripheral edge and that said adhesive layer is covered with said molding, wherein the steps of (b) and (d) are respectively controlled in accordance with a radius of curvature of the curved corner portion and/or with a sectional shape of the molding such that Mc/Vc becomes different from Ms/Vs.

26. A method according to claim 1, wherein the first and second thermoplastic molding materials are different from each other in composition.

* * * * *